(12) United States Patent
Henocq

(10) Patent No.: US 7,142,599 B2
(45) Date of Patent: Nov. 28, 2006

(54) METHOD AND DEVICE FOR SELECTING A TRANSCODING METHOD FROM A SET OF TRANSCODING METHODS

(75) Inventor: Xavier Henocq, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 611 days.

(21) Appl. No.: 10/436,269

(22) Filed: May 13, 2003

(65) Prior Publication Data

US 2003/0227977 A1 Dec. 11, 2003

(30) Foreign Application Priority Data

May 29, 2002 (FR) .................................. 02 06554

(51) Int. Cl.
*H04N 7/18* (2006.01)
(52) U.S. Cl. ..................... 375/240.03; 375/240.04; 375/240.05
(58) Field of Classification Search ............................... 375/240.01–240.29
See application file for complete search history.

(56) References Cited

U.S. PATENT DOCUMENTS

| | | | |
|---|---|---|---|
| 6,233,278 B1 | 5/2001 | Dieterich ............... | 375/240.03 |
| 6,327,392 B1 * | 12/2001 | Li ............................ | 382/248 |
| 6,940,903 B1 * | 9/2005 | Zhao et al. ............ | 375/240.08 |
| 6,993,075 B1 * | 1/2006 | Kim et al. ............. | 375/240.12 |

FOREIGN PATENT DOCUMENTS

| | | |
|---|---|---|
| GB | 2 327 577 | 1/1999 |
| WO | WO 00/07374 | 2/2000 |
| WO | WO 00/48400 | 8/2000 |
| WO | WO 02/32207 | 4/2002 |

OTHER PUBLICATIONS

Jean-Claude Bajard, et al., "On-line Motion Detection", Oct. 23, 2003, pp. 1 to 10 (Electronic revision of Didier, et al., In-line Movement Estimation Lim University of Provence (Dec. 1996)).
"Information Technology—Generic Coding of Audio-Visual Objects—Part 2: Visual Amendment 1: Visual Extensions", ISO/IEC JTC 1/SC 29/WG 11 N 3056, Dec. 1999, pp. ii to 524.
John R. Smith, et al. "Transcoding Internet Content for Heterogeneous Client Devices" (May 1998, pp. 1-4).
Anthony Vetro, et al. "Object-Based Transcoding for Adaptable Video Content Delivery" (Mar. 2001, pp. 387-401).
John R. Smith, et al. "Content-Based Transcoding of Images in the Internet" (Oct. 1998, pp. 1-5).
French Preliminary Search Report (FR 0206554) Feb. 21, 2003.

(Continued)

*Primary Examiner*—Andy Rao
(74) *Attorney, Agent, or Firm*—Fitzpatrick, Cella, Harper & Scinto

(57) ABSTRACT

An apparatus and method for selecting a method from a set of methods for transcoding video data, where the data may be transmitted between at least two communication apparatuses via a communication network, the method comprising the steps of determining at least one weighting factor ($W_1$, $W_2$) to attribute to each of the transcoding methods of the set, the at least one weighting factor depending on the data to be transcoded, weighting a mean value of at least one characteristic representative of each of the transcoding methods of the set by applying adapted weighting factors ($W_1$, $W_2$), and selecting a transcoding method as a function of the weighted mean values.

12 Claims, 9 Drawing Sheets

OTHER PUBLICATIONS

Harald Kosch, et al., "Modeling Quality Adaptation Capabilities of Audio-Visual Data", Institute of Information Technology, University Klagenfurt, Austria (Jul. 2001).

YongQing Liang, et al., "A New Content-Based Hybrid Video Transcoding Method", Proceedings 2001 International Conference on Image Processing, vol. I, IEEE, pp. iv, 429-432 (Oct. 7-10, 2001).

Jordi Ribas-Corbera, et al., "Rate Control for Low-Delay Video Communications", ITO—Telecommunications Standardization Sector; Study Group 16 Video Coding (Jun. 24-27, 1997).

Ephraim Feig, et al., "Fast Algorithm for the Discrete Cosine Transform", IEEE Transactions On Signal Processing, vol. 40, No. 9, pp. 2174-2193 (Sep. 1992).

* cited by examiner

METHOD AND DEVICE FOR SELECTING A TRANSCODING METHOD FROM A SET OF TRANSCODING METHODS

The present invention relates to a method and device for selecting a method from a set of methods of transcoding video data, the data being liable to be transmitted between at least two communication apparatuses via a communication network.

Technological advances in digital communication apparatuses such as television sets, pocket microcomputers, conventional microcomputers or any other miniaturized apparatus are such that, in future years, it will very probably be possible to exchange data of a multimedia type and, for example, audio and/or video between these different apparatuses.

Market studies show, moreover, that users are ready to purchase such communication apparatuses provided that the price is not too excessive and, above all, that the services rendered are of good quality.

Following the identification of this new market, many studies have been carried out concerning the miniaturization of electronic components, so as to obtain apparatuses with high memory and computational capacities within the smallest possible volume.

In addition, many standardization bodies have produced standards for unifying data exchanges between these apparatuses with different characteristics. These standards, such as those of the IEEE 802 family, allow both the implementation and the management of the transfer of data via a particular network.

IEEE 802.11 and its European counterpart HYPERLAN are dedicated to wireless local area networks. These are being particularly studied at the present time since they are broadband networks making it possible to transmit audio and/or video data between two machines which are geographically close.

These standards are therefore particularly adapted for developing wireless local area networks within dwellings.

The technical solutions currently being studied in the context of the above mentioned standards applied to home area networks permit wireless transmission of digital data either between a so-called server machine and a so-called client machine (point to point transmission), or between the server and several clients (multipoint communication).

In this environment, the data are stored on the server, which centralizes all the communications with the client or clients. This server can also serve as a gateway with the outside world (Internet, television, camcorder etc).

It should be noted that home area networks can be of a heterogeneous nature, that is to say they can, for example, consist partly of wireless connections and partly of cabled connections.

Though many projects are studying the implementation of services around interactive television and the exchange of information on the Internet, few of them are dealing with the problems related to the use of home area networks, namely the production of solutions for obtaining an acceptable service quality.

In this connection, it should be noted that the conveyance of data through a local area network is not a service which is easy to implement.

A communication system is known from the article "Transcoding Internet Content for Heterogeneous client devices" by J. Smith, R. Mohan, C-S. Li, Proc Int. Conf on circuits and Syst. (ISCAS), May 1998, which provides for the dynamic adaptation of the content of video data to be transmitted to a communication apparatus, to the characteristics of the apparatus and to the resources of the network.

To achieve this, a method is proposed of selecting a method of transcoding which will be adapted to the category of device and to the above-mentioned characteristics of that device and of the network.

More particularly, this method of selection searches among the methods of transcoding which are adapted to the device and to the above-mentioned characteristics for the method for which a maximum fidelity value is obtained.

It should be noted that the measurement of fidelity is representative of the impact of the transcoding method.

A method of selecting a transcoding method from a set of transcoding methods is also known from the article entitled "Modeling Quality Adaptation Capabilities of Audio-Visual Data", H. Kosch, L. Boszormenyi and H. Hellwagner, Institute of information technology, University Klagenfurt, Austria, July 2001.

In that article, it is proposed to classify the transcoding methods on a quality scale graduated from 0 to 1, 1 representing a perfect quality of restoration of the data while 0 signifies that the transcoded multimedia data are very little representative of the data before transcoding.

To evaluate the quality induced by a transcoding method, it is, for example, possible to perform, for all the transcoding methods considered, firstly a transcoding according to the method tested, then a decoding and a quality measurement.

However, this approach is costly in terms of calculation and memory space necessary.

A process of selecting a transcoding method which is known from the document entitled "A new content-based hybrid video transcoding method", Y. Liang and Y. Tan, In proc. Of International Conference and Image Processing 2001, ICIP 2001, proposes an approach which is not too costly in terms of calculation and memory space necessary.

According to the process described, firstly two video descriptors are determined for each image of a video sequence to be transcoded.

These descriptors measure the spatial activity and the temporal activity.

As a function of these descriptors thus determined the process selects a transcoding method of maximum quality from three types of transcoding methods which respectively propose a re-quantization (reduction of bit rate), a reduction of the frame rate and a reduction of the spatial resolution.

However, the approach which is proposed in this document does not always make it possible to achieve the selection of a transcoding method which is the best adapted possible to the content of the video sequence to be transcoded.

More particularly, according to that approach, a measurement expressing strong spatial activity and a measurement expressing low temporal activity lead to the selection of a transcoding method using a re-quantization whereas a reduction in the frame rate is clearly the best adapted.

The present invention makes provision for remedying at least one of the aforementioned drawbacks by proposing a novel method of selecting a method from a set of methods of transcoding video data, said data being liable to be transmitted between at least two communication apparatuses via a communication network, wherein the selection method comprises the following steps:

determining at least one weighting factor to attribute to each of the transcoding methods of the set, said at least one weighting factor depending on the data to be transcoded, weighting a mean value of at least one characteristic representative of each of the transcoding methods of the set by applying adapted weighting factors, selecting a transcoding method as a function of the weighted mean values.

In a complementary manner the invention relates to a device for selecting a method from a set of methods of transcoding video data, said data being liable to be transmitted between at least two communication apparatuses via a communication network, wherein the device comprises:

means for determining at least one weighting factor to attribute to each of the transcoding methods of the set, said at least one weighting factor depending on the data to be transcoded, means for weighting a mean value of at least one characteristic representative of each of the transcoding methods of the set by applying adapted weighting factors, means for selecting a transcoding method as a function of the weighted mean values.

Thus the mean values of the characteristics representative of the transcoding methods of the set of methods are weighted by applying a weighting factor which depends on the data to be transcoded and which is adapted to the transcoding methods.

These weighted values make it possible to refine the method of selecting a transcoding method from a set of transcoding methods by amplifying the difference between the methods which are adapted to the data to be transcoded and those which are not adapted.

For example, if a characteristic representative of each transcoding method is a measurement of the quality produced by the transcoding method, then the weighted mean values of quality will make it possible to refine the choice of a transcoding method by amplifying the difference in quality between the transcoding methods which are adapted to the data to be transcoded and those not adapted.

Furthermore, the mean value of at least one characteristic representative of each transcoding method may be obtained before one of the communication apparatuses selects a transcoding method, in that obtaining that mean value does not depend on the data to be transferred.

More particularly, the mean value may be obtained before the aforementioned apparatus receives a request coming from the apparatus wishing to receive data.

This faculty consequently makes it possible to reduce the number of operations, and more particularly the volume of calculation, to be carried out on-line, that is to say when the connection between the apparatuses is established.

This is all the more the case in that the invention provides for the extraction of a small quantity of information from the data to be transcoded, which also contributes to reducing the volume of calculation carried out on-line.

According to one feature, the method comprises a prior step of classifying the transcoding methods of the set into several types of method, the weighting factor being thus determined according to the type of transcoding method and the weighting step being carried out according to the weighting factor adapted to the type of transcoding method concerned.

According to one feature, the determination of said at least one weighting factor depends on said at least one characteristic representative of each transcoding method which will be weighted.

According to one feature, the mean value of said at least one characteristic representative of each of the transcoding methods of the set is obtained, for each method, on the basis of a plurality of values of the characteristic considered which have respectively been obtained by the application of the method concerned to a plurality of sequences of so-called training data.

Thus, by using training data sequences which form a sufficiently heterogeneous set to represent practically all the extreme cases of data sequences to transcode, it is possible to obtain, for each method, a mean value of one or more characteristics.

According to another feature, the step of determining said at least one weighting factor makes provision, on the one hand, for measuring the spatial activity and the temporal activity of the data to be transcoded and of the training data sequences, and on the other hand, for comparing between the measurements of the same nature.

The invention thus obtains very good results in terms of choice of the transcoding method the best adapted by extracting little information from the data to be transcoded (video sequence). More particularly, it is sufficient to perform a measurement of the spatial activity of the data to be transcoded and a measurement of the temporal activity of these data.

This reduction in the volume of calculation to be performed on-line and which may prove, in certain cases, to be a drawback, is achieved by virtue of the fact that the other information (mean values of the characteristics, etc.) necessary for the implementation of the selection of a transcoding method according to the invention are obtain off-line.

According to one feature, as a function of the result of the comparisons made between the measurements, the weighting factor or factors to be attributed to the transcoding methods is deduced.

According to one feature, a characteristic representative of each of the transcoding methods of the set is a measurement of the quality produced by the method concerned.

Subsequently, there will for example be carried out a weighting of the mean values of quality respectively obtained for the different transcoding methods.

Advantageously, the cost related to the estimation of the quality produced by the transcoding methods on the current sequence is strongly reduced by an approach to weighting of the mean values of distortion obtained on the basis of a set of training sequences.

For example, the spatial activity is measured by the variance and the temporal activity is measured by the root mean square error.

According to one feature, a weighting factor is written as $W_1=1\pm A'$ according to the sign of $A'$, with $A'=|A|/255^2$ and $A=\text{var}-\text{VAR}$, where var represents a measurement of the mean variance of the data to be transcoded and VAR represents a measurement of the mean variance of the training data sequences.

This factor is preferentially to be attributed to the methods of reducing the frame rate.

According to one feature, a weighting factor is written as $W_2=1\pm B'$ according to the sign of $B'$, with $B'=|B|/255^2$ and $B=\text{rmse}-\text{RMSE}$, where rmse represents a measurement of the root mean square error of the data to be transcoded and RMSE represents a measurement of the root mean square error of the training data sequences.

This factor is preferentially to be attributed to the methods of re-quantization and to the methods of reduction of the spatial resolution.

Thus, obtaining a weighting factor is relatively simple to achieve. Obtaining this factor leads to only a relatively small number of calculations to be performed and only requires a limited amount of memory space.

According to another feature, each of the transcoding methods of the set is also represented by at least one of the characteristics which are the format of the images after transcoding by the method concerned, the bit rate produced by the method concerned and the memory space necessary for the decoding of the transcoded data generated by the method concerned.

It is thus possible to weight the mean values of a characteristic other than that of the quality.

According to still another feature, the selection method comprises a step of testing the compatibility of each transcoding method with at least one constraint associated with at least one of the communication apparatuses and/or with the network.

More particularly, the data liable to be transferred must be adapted to the context in which they are transmitted, i.e., for example, one or more characteristics of the communication apparatus or apparatuses which are to receive the data.

One characteristic may be, for example, the calculation capacity of one of the apparatuses.

It may also be the authorized bit rate over the communication network.

The invention also concerns a communication apparatus comprising a device as briefly disclosed above.

According to another aspect, the invention also relates to:
an information storage means which can be read by a computer or a microprocessor containing code instructions for a computer program for executing the steps of the method according to the invention as for the one briefly disclosed above, and
a partially or totally removable information storage means which can be read by a computer or a microprocessor containing code instructions for a computer program for executing the steps of the method according to the invention as for the one briefly disclosed above.

According to yet another aspect, the invention relates to a computer program which can be loaded into a programmable apparatus, containing sequences of instructions or portions of software code for implementing steps of the method according to the invention as briefly disclosed above, when said computer program is loaded and executed on the programmable apparatus.

As the features and advantages relating to the device, to the communication apparatus comprising such a device, to the information storage means and to the computer program are the same as those disclosed above concerning the method according to the invention, they will not be repeated here.

Other features and advantages of the present invention will emerge more clearly from a reading of the following description, given with reference to the accompanying drawings, in which:

FIG. 4b represents the structure of XML data grouping together, for each transcoding method, the mean values of the characteristics obtained by the algorithm of FIG. 4a;

FIG. 1 shows a communication architecture of the client-server type in which the invention is advantageously implemented.

Figure 1:
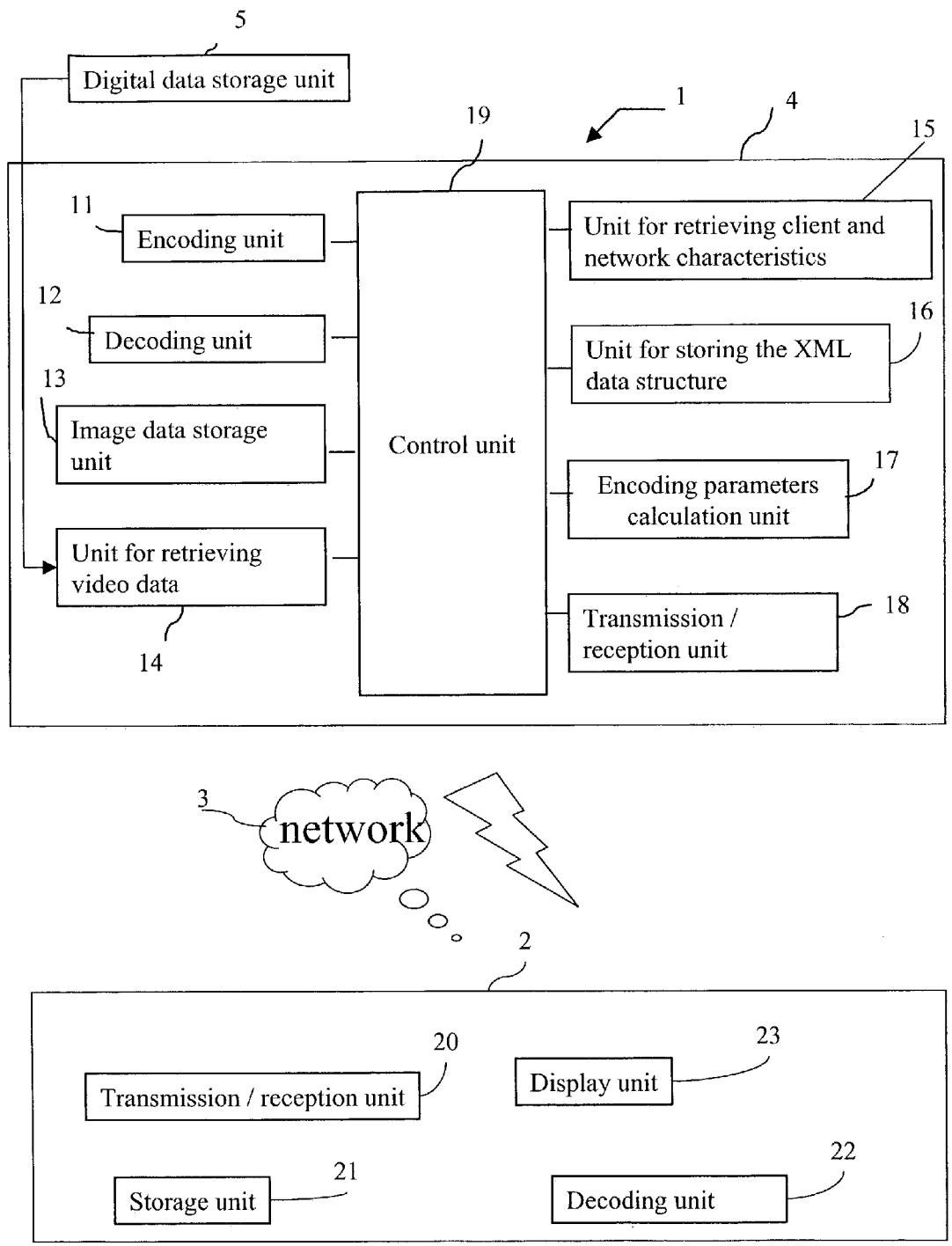
FIG. 1 shows schematically a communication architecture of the client-server type in which the invention can be implemented.

In this figure, a first communication apparatus 1 fulfilling the role of the server is connected to a second communication apparatus 2, which is the client machine, by means of a communication network 3 and a connection which is considered as being established.

This network is for example a wireless local area communication network within a dwelling.

More particularly, this network is in accordance with the standard IEEE802.11.

The example considered concerns a point-to-point transmission of data between the server 1 and the client machine 2.

However, the principle remains applicable to the case where the server is connected simultaneously to several client machines which may require multimedia digital data from the server.

It is however necessary, in this case, to take into account, on the one hand, the management of the processes of adaptation and transmission in parallel with the different adapted versions of the data requested, and on the other hand, the multiple accesses to the memory or memories of the server.

It should be noted that the data stored in the server can have been received from the environment external to the dwelling, for example through another communication network such as the Internet.

In the example embodiment under consideration, only digital video data will be considered and these will be transmitted without loss over the network 3.

The device according to the invention will generally make it possible to select a transcoding method from a set of transcoding methods by taking into account the content of the data requested by a client machine.

The device 4 according to the invention is for example integrated into the server 1 in FIG. 1 and can comprise electronic elements and/or software elements.

However, the device according to the invention could, for example, be integral with the server 1.

The device 4 comprises units 11 and 12, which make it possible respectively to encode and decode a video sequence.

The server comprises a unit 5 for storing digital data such as videos.

The algorithms of the encoding and decoding methods will be described respectively with reference to FIGS. 3a and 3b.

It should be noted that the videos are created, for example, by a digital camcorder or any other data acquisition means or are transmitted by an external communication network and are stored in the unit 5, which can be included or not in the device 4.

This unit can for example be a local or distributed database.

In addition, the videos are stored, according to a preferred embodiment of the invention, in compressed form, using the encoding method implemented in the encoding unit 11.

The device 4 also comprises a storage unit 13 adapted to temporarily store digital data and encoded videos, and a unit 14 for retrieving data characteristic of the videos from the storage unit 5.

The data retrieved by the unit 14 are either the values associated with each of the pixels of each image of a video or the information peculiar to this video, namely the size of the video file, the path for accessing this video and, where the video is stored in compressed form, the encoding parameters which were used for encoding this video.

The device 4 also comprises a unit 15 for retrieving the characteristics of the client machine 2, namely, for example, the computational capacity, the size of its memory and the resolution of its display screen.

Unit 15 also retrieves the characteristics of the communication network 3, that is to say, for example, the bit rate authorized taking into account the available bandwidth.

It should be noted that these characteristics can be obtained following the transmission of a specific request by the device 4.

Device 4 further comprises a unit 16 for storage of a data structure of XML type which will be dealt with below, a unit 17 for determination of the encoding parameters the operation of which will be detailed with reference to FIG. 4, and a digital data transmission/reception unit 18.

The unit 18 makes it possible to carry out the transmission of data to the client machine 2 through the network 3, as well as the reception of data coming from the client machine.

The device 4 according to the invention also comprises a unit 19 for controlling the different operations performed in the device.

It should be noted that the different units which make up the device according to the invention, and more generally the server, are resident on the same machine.

However, it can be envisaged to distribute these units over several server machines and to establish communications between these different units through the communication network 3.

Since this distribution of the units in no way modifies the implementation of the invention, it will be considered hereinafter, for reasons of simplicity, that all the units are located on the same machine, which will be referred to as the server.

As for the client machine 2, this comprises a digital data transmission/reception unit 20.

This unit 20 makes it possible to carry out the transmission of data to the device 4, through the network 3, and the reception of data coming from the device.

The client machine 2 also comprises a digital data storage unit 21, a decoding unit 22 identical to the unit 12 of the device 4 and a display unit 23, for displaying decoded videos.

Figure 2:
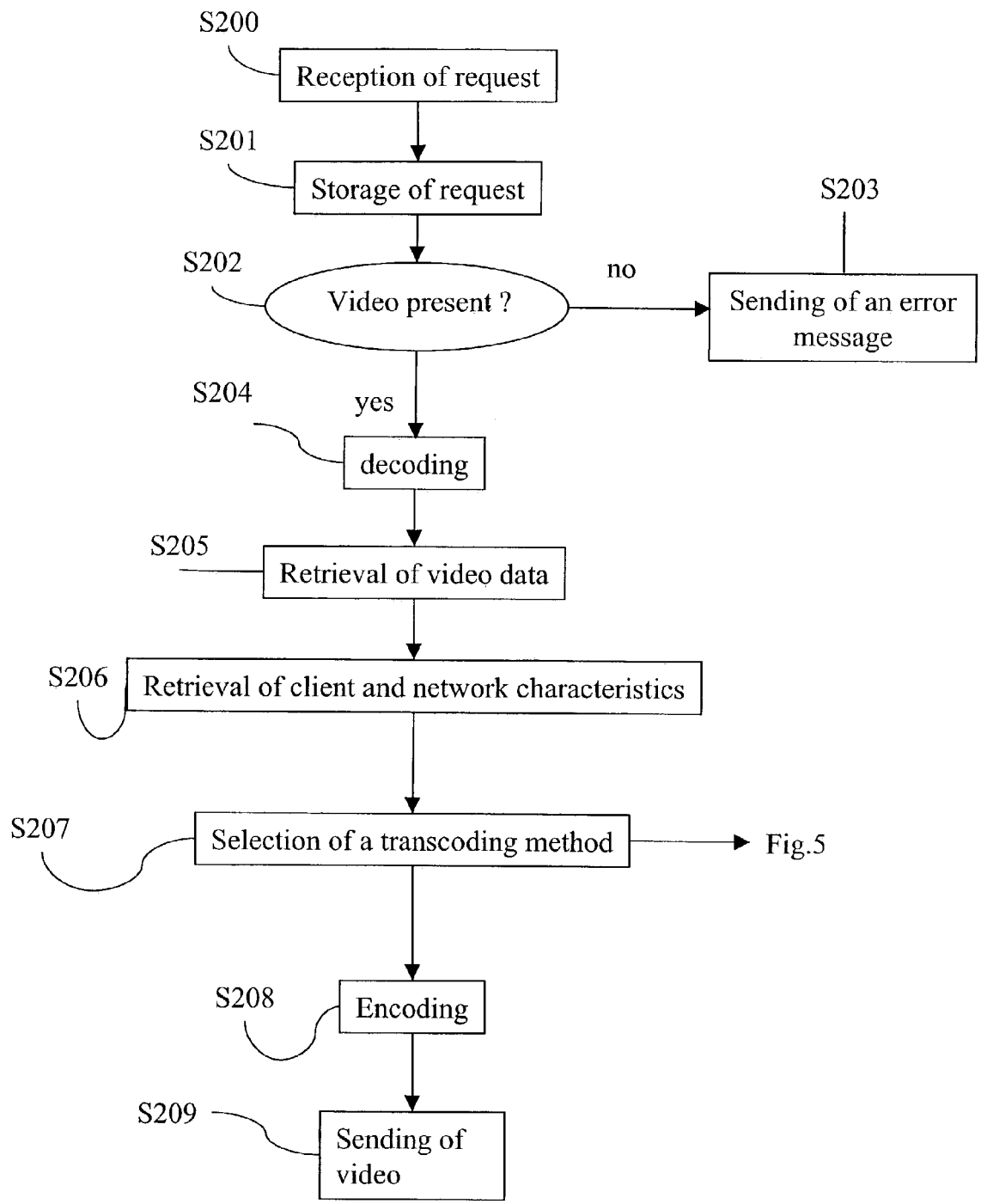
FIG. 2 shows a video data processing algorithm according to the invention.

FIG. 2 illustrates an algorithm comprising different instructions or portions of software code corresponding to steps of the method according to the invention.

The computer program denoted "Progr" which is based on this algorithm is stored in the temporary data storage unit 13 of FIG. 1 and executed by the unit 17 under the control of the control unit 19, which thus makes it possible to implement the method according to the invention.

Figure 7:
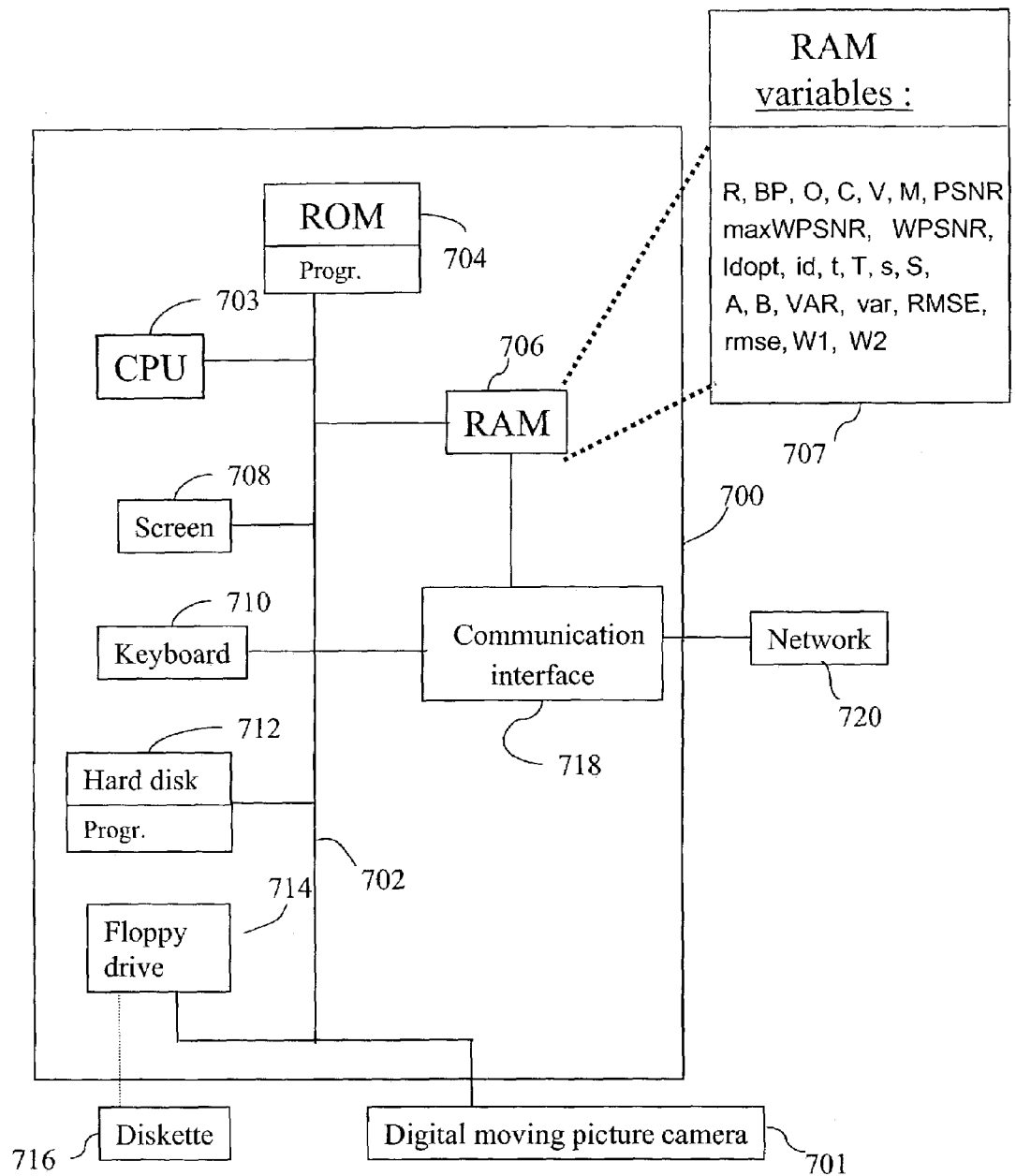
FIG. 7 is an embodiment of a programmable apparatus implementing the invention.

This program is also stored in the apparatus of FIG. 7.

The algorithm of FIG. 2 comprises a first step denoted S200, during which the device 4 of FIG. 1 and, more particularly, the reception unit 18 receives a request sent by the client machine 2 from the transmission unit 20.

For example, this request is in the form of a string of characters making it possible to uniquely identify video data stored in the storage unit 5 of the server 1.

During the following step S201, the request coming from the client machine 2 is transferred to the temporary storage unit 13 for the purpose of storage.

Step S201 is followed by a step S202, during which a test is performed to determine whether the video data forming the subject of the request from the client machine are available in the storage unit 5.

If the test carried out during this step is negative, the following step S203 provides for sending an error message to the client machine informing it that the requested video data are not available on the server.

If affirmative, step S202 is followed by a step S204 during which the decoding unit 12 of the device of FIG. 1 decodes the video data according to the encoding parameters supplied, for example, by the header of the bit stream stored in the storage unit 5.

It will be noted that each image of the video sequence requested by the user is, for example, divided into blocks of data of 8×8 pixels.

Each group of four blocks forms a macroblock of 16×16 pixels.

The encoding of an image is carried out on each of the macroblocks using two distinct encoding modes: one denoted I for the Intra encoding mode and the other denoted P for the predictive or Intra encoding mode.

A sequence of images of 1 second will be encoded in the following manner: IPPIPPIPPIPPIPPIPPIPPIPPIPPIPP etc.

This means that the first image is encoded according to the Intra mode, the following two according to the Inter mode, the following according to the Intra mode, the following two according to the Inter mode, etc.

Thus, for a sequence of 30 images per second, 10 images will be encoded in Intra mode and 20 images in Inter mode.

It should be noted that a sequence of images will hereinafter be referred to as a segment.

During the decoding performed at step S204, the decoding unit 12 of FIG. 1 measures the spatial activity and the temporal activity of the current video sequence. More particularly, unit 12 counts the number of macroblocks encoded with each mode for each image and calculates the variance (spatial activity) of each macroblock.

Moreover, as for the temporal activity, this will be estimated by measuring the root mean square error, denoted RMSE, between the current image and the image which precedes it in the sequence.

Once the decoding of the video data has taken place, the decoded data presented, for example, in YUV format, as well as the aforementioned encoding parameters are stored in the storage unit 13.

It should be noted that a video format of the YUV type means that the video concerned has three components, the component Y for luminance and the components U and V for chrominance.

Note that for each image of the video sequence, the number of macroblocks encoded in Inter mode and in Intra mode are stored in unit 13, together with a mean variance (mean of the variances of the macroblocks of the image) and its root mean square error with respect to the preceding image.

Step S204 which has just been described is followed by a step S205 during which unit 14 retrieves video data, namely the number of images per second and the resolution of each image.

During the following step S206, unit 15 of FIG. 1 proceeds with the obtainment of the characteristics of the client machine 2 which sent the request mentioned at step S200.

The characteristics of the client machine are for example retrieved following on from the transmission of a request to obtain these characteristics, from the device 4 of FIG. 1 to the client machine 2, through the communication network 3.

These characteristics are principally the computational capacity of the client machine 2, namely the total number of operations which it can perform, the size of its memory, and the resolution of its display unit 23 (screen).

Unit 15 also proceeds with the obtainment of the characteristics of the communication network 3, namely, for example, the bit rate.

It will be noted that the characteristics of the communication network 3 may also be, for example, the data loss rate at the time of the transmission of video data between the device 4 and the client machine 2, the bit error rate, etc.

These characteristics are stored in a temporary fashion in the storage unit 13 of the device 4 in FIG. 1.

Preferentially, the computational capacity of the client machine is equal to the speed of the processor thereof, expressed as a number of elementary operations per second.

Preferentially, the characteristics of the network taken into account will be limited to the available bandwidth and thus to the bit rate available on the network.

Step S206 is followed by the step S207 which selects, from the unit 17, a transcoding method from a given set of transcoding methods, taking into account the video data to be transcoded and transmitted.

Furthermore, the method will, for example, also be selected so as to adapt the video data which is to be transmitted to the client machine, to the characteristics of the client machine and to the characteristics of the network.

The transcoding methods proposed in this set are, for example, the following: conservation of the original compressed sequence, reduction of the spatial resolution from CIF (format 352 by 288) to QCIF (format 176 by 144), conservation of the initial frame rate, reduction of the frame rate from 30 to 20 frames per second, from 30 to 15 frames per second, from 30 to 10 frames per second, from 30 to 5 frames per second and from 30 to 1 frame per second, conservation of the initial bit rate, re-quantization to reduce the bit rate by 10%, re-quantization to reduce the bit rate by 20%, re-quantization to reduce the bit rate by 30%, and re-quantization to reduce the bit rate by 40%.

The details of the operations performed during step S207 will be provided subsequently during the description given with reference to FIG. 5.

This step is performed by the unit 17 of the device 4 of FIG. 1 under the control of the control unit 19 and using the information available in the storage unit 13.

It will be noted that the transcoding methods presented here are classified into three types: reduction of the spatial resolution, reduction of the frame rate, and re-quantization.

1) To reduce the spatial resolution, the encoding unit 11 will begin by subsampling each image of the decoded original video sequence by deleting one out of every two pixels in each line of each image of the original sequence, then, by deleting one pixel out of every two in each column of each image of the original sequence.

The unit 11 will next proceed with the actual encoding of the subsampled sequence.

During the encoding, the choice of the encoding mode of the macroblocks of the transcoded sequence will be made as a function of the encoding modes of the macroblocks of the original sequence.

It is known that on changing from CIF format to QCIF format, the number of macroblocks is divided by 4, that is to say that a macroblock of the transcoded sequence corresponds to four macroblocks of the original sequence.

If in the four original macroblocks, a majority of macroblocks encoded in Intra mode is to be found, then the macroblock of the transcoded sequence will be encoded in Intra mode.

Conversely, if there is a majority of macroblocks encoded in Inter mode, the macroblock of the transcoded sequence will be encoded in Inter mode.

If no mode is in the majority, the macroblock will be encoded in Intra mode.

2) A second type of transcoding method consists in reducing the frame rate of the video sequence. To do this, let FT and FT' be respectively the initial frame rate and the frame rate after application of the transcoding method considered. In each group of successive FT images of the decoded sequence a number H of images equal to FT−FT' will then be removed. The H images removed will be spaced apart as regularly as possible in each group of FT images.

3) To re-quantize the sequence by reduction of the bit rate, the sequence will be encoded with a bit rate constraint equal to the initial bit rate of the original sequence reduced by the bit rate percentage specified by the transcoding method.

A bit rate control loop such as that proposed in the article entitled "*Rate control for low-delay Video communication*", by J. Ribas-Corbera, S-Lei, *Draft ITU-telecommunications standardization sector. Ref.*: Q15-A-20 will make it possible to control the bit rate of the encoding unit.

For this transcoding method, the encoding modes of the original macroblocks will be kept in the transcoded sequence.

The step S207 of the algorithm is then followed by a step S208 which proceeds with the encoding of the video data following the parameters defined at the step S207 (selected transcoding method).

During the following step S209, the device 4 of FIG. 1 and, more particularly, the transmission unit 18 thereof transmits the video data which were previously encoded to the client machine 2.

It should be noted that the transmission of the compressed video data preferably takes place "on the fly", the process being known as "streaming", that is to say the information necessary to the user for reconstructing an image is stored in the storage unit 13 and then transmitted to the client machine 2 before all the video data are compressed.

Thus the user receives the information at the client machine 2 in packets, in each of which there is information enabling this user to decode a current image.

Figure 3A:
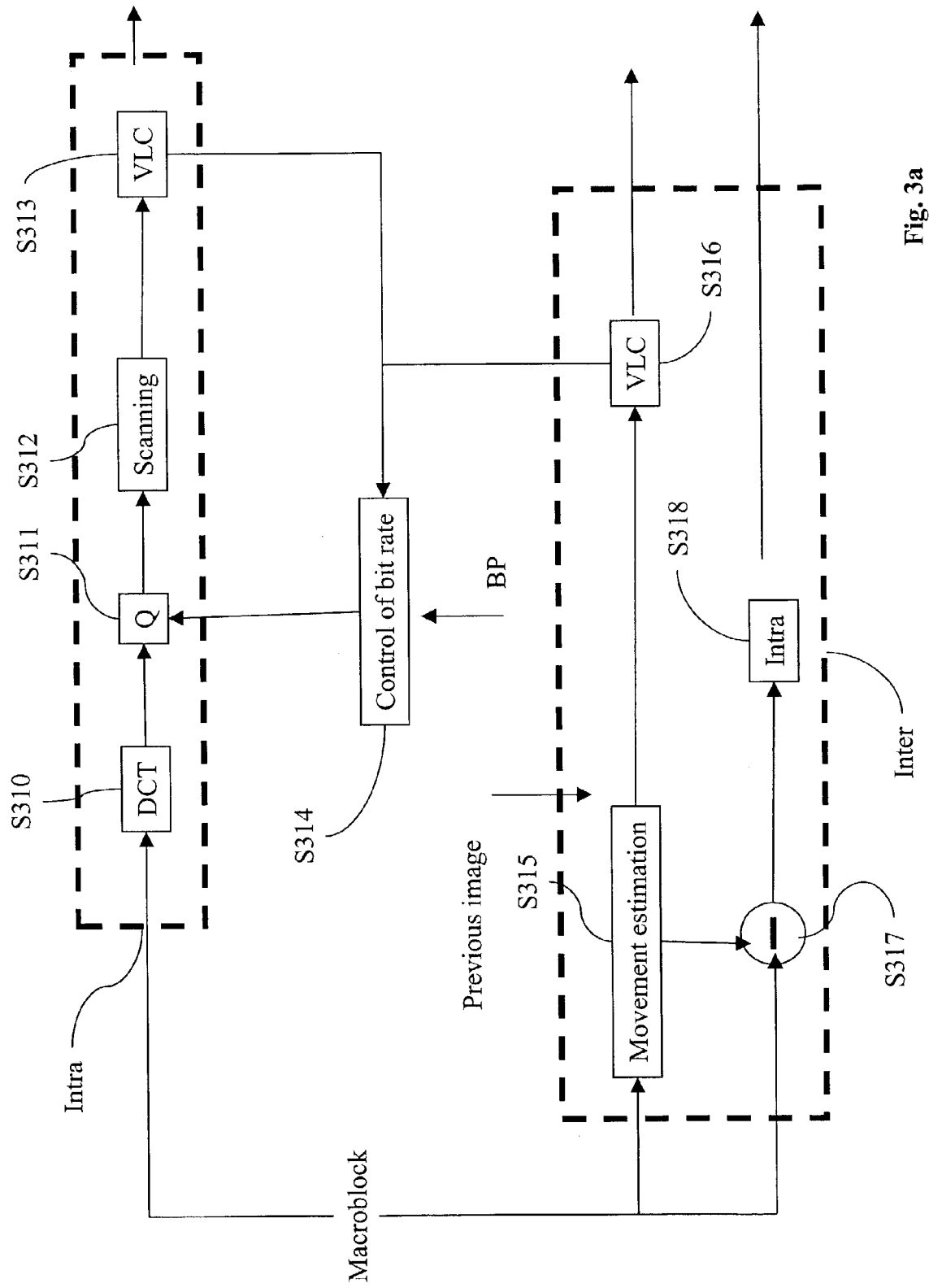
FIG. 3a shows a video data encoding algorithm.
Figure 3B:
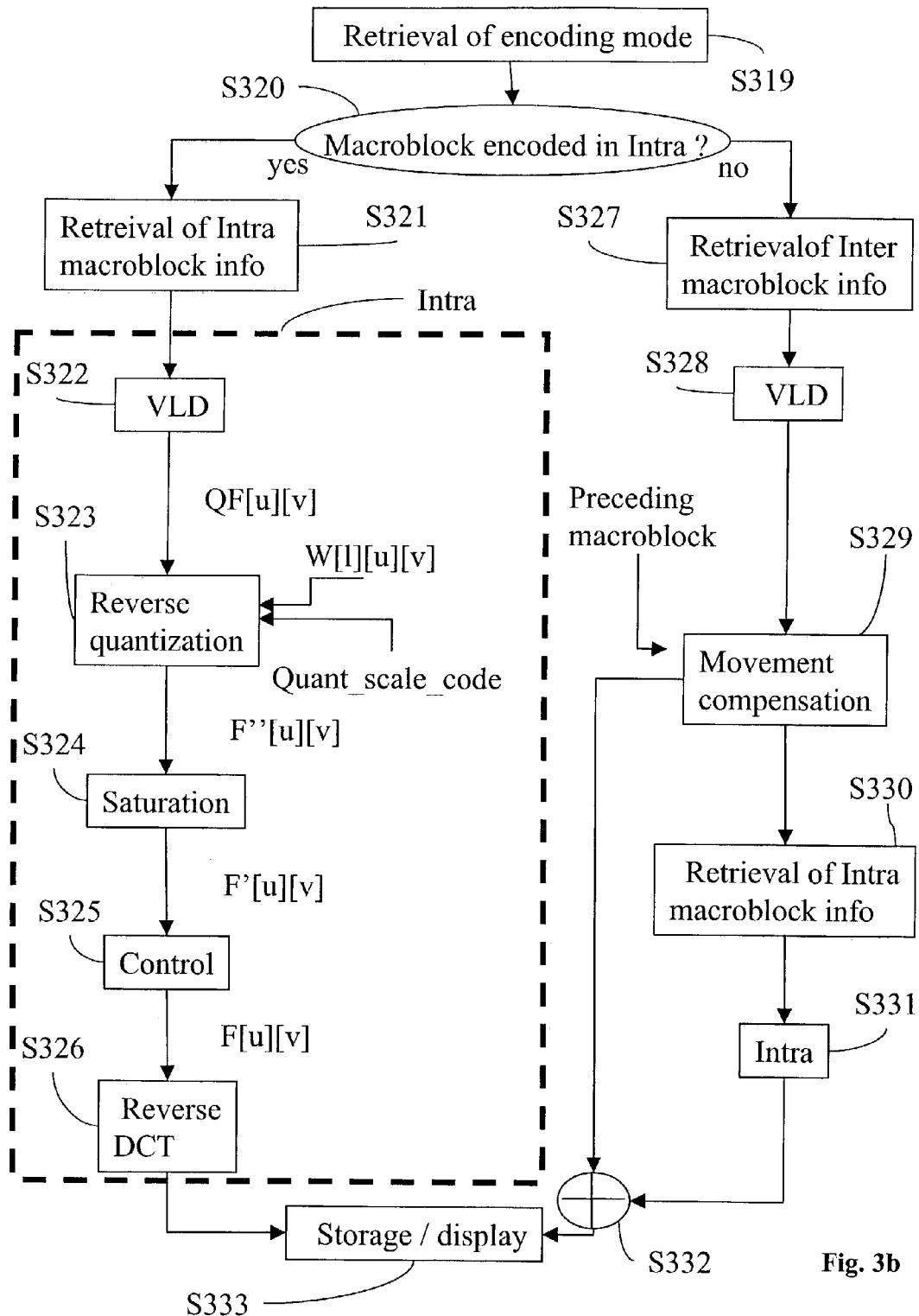
FIG. 3b shows a video data decoding algorithm.

FIGS. 3*a* and 3*b* illustrate respectively the encoding and decoding of a color video in YUV format.

According to a preferred embodiment of the invention, the video decoder used for implementing this invention is in accordance with the visual part of the standard MPEG-4 (Information Technology—Generic Coding of Audio-Visual Objects=Part 2: Visual, ISO/IEC JTC1/SC 29/WG11 N 3056, December 2000).

In the example dealt with here, the video will be considered to be a single object of rectangular shape.

Consequently only a restricted set of compression tools which allow the texture decoding and movement compensation will be taken into account. The tools necessary for the decoding of the arbitrary form of an object are therefore not used here.

It should be noted that the texture of an image is given by the values of the pixels of the image which are expressed in three components.

The videos are stored on the server 1 in a form compressed to mp4 format conforming to the MPEG-4 standard. Use is made for example of the YUV format of the type 4:2:0, which means that the chrominance components (U, V) have four times fewer samples (pixels) than the luminance components (Y).

FIG. 3a illustrates the encoding method used by the encoding unit 11 of FIG. 1.

In Intra mode, the encoding takes place block by block in accordance with steps S310 to S313 in FIG. 3a.

In this encoding mode, each block constitutes an elementary data unit which is encoded independently of the other blocks.

It should be stated that the values of the pixels of each image of the segment of images to be encoded are stored temporarily in the temporary storage unit 13 in FIG. 1 and constitute a video which is referred to as the original video.

Where the video is stored in the storage unit 5, the decoding method is applied at step S204 of FIG. 2 so as to obtain a video in YUV format.

The values of the video thus reconstructed are stored in the temporary storage unit 13 and in the storage unit 5.

The method of encoding a block in Intra mode begins with a step S310 during which the discrete cosine transform is calculated according to the known method described in the article entitled "*Fast Algorithms for the Discrete Cosine Transform*", E. Feig and S. Winograd, *IEEE Trans. On Signal Proc.*, vol. 40, No. 9, September 1992.

Step S310 is followed by a step S311, which makes provision for quantizing the transformed coefficients obtained during step S310.

Step S311 is followed by a step S312 during which the quantized coefficients are ordered so that the variable-length encoding method used during the subsequent step S313 is as effective as possible.

For this purpose, the scanning method is used which is described in the standard *Information Technology—Generic Coding of Audio-Visual Objects=Part 2: visual*, ISO/IEC JTC 1/SC 29/WG 11 N3056, December 2000.

Step S312 is followed by a step S313 according to which the statistical encoding of the ordered coefficients is carried out according to the variable-length encoding method described in the standard *Information Technology—Generic Coding of Audio-Visual Objects=Part 2: visual*, ISO/IEC JTC 1/SC 29/WG11 N3056, December 2000.

At the end of step S313, the statistically encoded coefficients are stored in the temporary storage unit 13 and are concatenated with the other encoding information of the current image.

In predictive or Inter mode, the encoding is carried out macroblock by macroblock, where each macroblock constitutes an elementary data unit which is encoded independently of the others.

Each of the macroblocks can be encoded either in Intra mode or in Inter mode.

If the macroblock is encoded in Intra mode, then the encoding is carried out according to steps S310 to S313 described previously.

If the macroblock is encoded in Inter mode, the encoding is carried out according to steps S315 to S317, which will be explained below.

During step S315, a conventional method of movement estimation by comparison of macroblocks is applied.

The algorithms used are based on the simplifying hypothesis according to which the pixels of the same macroblock have the same movement imparted to them.

The movement vector of a macroblock of a current image is then determined by finding the macroblock with the greatest resemblance in the previous image in a preselected search window.

If the dimensions of the search window exert an influence on the time for calculating the movement estimation, the major problem related to the movement estimation which is carried out by comparing macroblocks remains the determination of the distance between the macroblocks.

Use will preferably be made of a movement estimation method described in the article "*In-line Movement Estimation*", by L. Difdier, R. Kamdem, LIM University of Provence, December 1996.

This method makes it possible to obtain a movement vector with two translation movement components.

To obtain a bitstream conforming to the MPEG-4 standard, this movement vector is encoded differentially with respect to a prediction carried out on the basis of movement vectors of the macroblocks already encoded in the immediate neighborhood of the current macroblock.

Step S315 is followed by a step S316 during which the previously determined differential movement vector is statistically encoded.

The coefficients thus obtained are stored in the temporary storage unit 13 and are concatenated with the other encoding information of the current image.

Once the movement for a macroblock has been estimated during the execution of step S315, then, in accordance with step S317, a so-called predicted macroblock is constructed from the macroblock of the previous image to which the movement vector associated with this macroblock is applied.

Next, a so-called difference macroblock is calculated between the macroblock of the current image and the predicted macroblock.

The variance of this difference macroblock is then measured.

If the variance is greater than a predetermined threshold, then the macroblock of the current image is encoded in Intra mode.

This macroblock will be encoded in Inter mode in the opposite case.

Step S317 is followed by a step S318 during which either the difference macroblock is encoded according to the Intra mode described above, or the current macroblock is encoded according to the Intra mode.

The coefficients resulting from the Intra encoding mode are stored in the temporary storage unit 13 and are concatenated with the other encoding information of the macroblock of the current image.

The parameters used during the quantization and variable-length encoding steps are defined for each macroblock, whether in Intra mode or Inter mode.

For this purpose, a conventional bit rate control method is used during a step S314.

This method makes it possible to control the allocation of bit rate for each macroblock so as to not to exceed the total bit rate allocated to the transmission of the compressed video.

In the example described, the maximum bit rate value is fixed by the value BP.

The data encoded and temporarily stored in unit 13 are put in MPEG-4 format, as indicated in the standard *Information technology—Generic coding of audio-visual objects=part2:* visual, ISO/IEC JTC 1/SC 29/WG11 N3056, December 2000, before being transmitted over the network 3 of FIG. 1 to the client machine 2.

It should be noted that the encoding mode used for encoding each macroblock forms part of the information transmitted.

FIG. 3b illustrates the decoding method used by the decoding unit 12 of the device 4 and by the decoding unit 22 of the client machine 2 in FIG. 1.

The decoding method will be described when it is used in the client machine 2 and, more particularly, at the units 20, 21 and 22.

The transposition of this description to the decoding method used by the device 4 of the server 1 is carried out easily by replacing the units 20, 21 and 22 respectively with the units 18, 13 and 12.

The client machine 2 has a storage unit 21 supplied with the digital data coming from the device 4 by means of the connection established between the two machines through the network 3.

These data are received by the reception unit 20 in the form of packets which contain the information necessary for decoding one or more macroblocks of the current image.

The storage unit 21 is capable of extracting information from the bitstream generated by the encoding unit 11 of the device 4 and supplying it to the decoding unit 22 of the client machine 2.

FIG. 3b illustrates the decoding of a macroblock encoded either in Intra mode, as indicated by steps 322 to 326, or in Inter or predictive mode as indicated by steps 327 to 332.

The decoding algorithm begins with a step S319 during which the encoding mode of the current macroblock is retrieved.

During step S320, a test is carried out to determine whether the macroblock was encoded in Intra mode.

If so, step S320 is followed by a step S321, which makes provision for retrieving, from the storage unit 21, the statistical coefficients (variable-length codes) related to this macroblock.

Step S321 is followed by a step S322, which performs the decoding of these coefficients in accordance with the table of coefficients described in the standard *Information Technology—Generic Coding of Audio-Visual Objects=Part 2: 2: visual*, ISO/IEC JTC 1/SC 29

The coefficients thus obtained form a set of bi-dimensional data denoted QF[u][v].

During the following step S323, an inverse quantization operation is performed on the values of the set of data QF[u][v] in order to obtain the bi-dimensional table F"[u][v] according to the quantization tables described in the standard *Information Technology—Generic Coding of Audio-Visual Objects=Part 2: visual*, ISO/IEC JTC 1/SC 29/WG11 N3056, December 2000.

During the following step S324, a saturation method is applied to the values of the coefficients of the bi-dimensional table F"[u][v] in accordance with the standard *Information technology—Generic coding of audio-visual objects=part2: visual*, ISO/IEC JTC 1/SC 29/WG11 N3056, December 2000, so as to obtain the bi-dimensional table F'[u][v] whose values belong to the interval $[-2^{bits\ per\ pixel+3}, 2^{bits\ per\ pixel+3}-1]$.

The number of bits per pixel is preferably 8.

During the following step S325, an operation of controlling the saturated coefficients is performed so as to obtain the DCT coefficients F[u][v].

During the following step S326, the values of the pixels of the current macroblock are reconstructed as a function of the DCT coefficients F[u][v] using the decoding method described in the article "Fast Algorithms for the Discrete Cosine Transform", E. Feig and S. Winograd, *IEEE Trans. On Signal Proc.*, vol. 40, No. 9, September 1992.

These reconstructed values are stored in the storage unit 21 with a view to being displayed on the display unit 23.

The algorithm for decoding a macroblock is given below.

The values of the coefficients dc_scaler, quantizer_scale and of the matrix W[l][u][v] used in this algorithm are values defined by the standard *Information Technology—Generic Coding of Audio-Visual Objects=Part 2: visual*, ISO/IEC JTC 1/SC 29/WG11 N3056, December 2000.

```
for (v=0; v<8;v++) {
    for (u=0; u<8;u++) {
        if (QF[u][v] == 0)
            F"[u][v] = 0;
        else if ( (u==0) && (v==0) && (macroblock_intra) ) {
            F"[u][v] = dc_scaler * QF[u][v];
        } else {
            if ( macroblock_intra ) {
                F"[u][v] = ( QF[u][v] * W[0][u][v] * quantiser_scale ) / 32;
            } else {
                F"[u][v] = ( ( ( QF[u][v] * 2 ) + Sign(QF[u][v]) ) * W[1][u][v]
                    * quantiser_scale ) / 32;
            }
        }
    }
}
sum = 0;
for (v=0; v<8; v++) {
    for (u=0; u<8;u++) {
        if ( F'[u][v] > 2^bits_per_pixel+3 - 1 ) {
            F'[u][v] = 2^bits_per_pixel+3 - 1;
        } else {
            if ( F"[u][v] < -2^bits_per_pixel+3 ) {
                F'[u][v] = -2^bits_per_pixel+3;
            } else {
                F'[u][v] = F"[u][v];
            }
```

```
        }
    sum = sum + F'[u][v];
    F[u][v] = F'[u][v];
        }
}
if ((sum & 1) == 0) {
    if ((F[7][7] & 1) != 0) {
        F[7][7] = F'[7][7] −1;
    } else {
        F[7][7] = F'[7][7] + 1;
    }
}
```

The method for the discrete cosine transformation of a pixel f(x,y) of a block of size N×N is given by the following equation:

$$F(u, v) = \frac{2}{N} C(u)C(v) \sum_{x=0}^{N-1} \sum_{y=0}^{N-1} f(x, y) \cos\frac{(2x+1)un}{2N} \cos\frac{(2y+1)vn}{2N}$$

with u, v = 0, 1, 2, ... N − 1, where x, y are the spatial coordinates, u, v are the coordinates in the transformed domain, and $$C(u), C(v) = \begin{cases} \frac{1}{\sqrt{2}} & \text{for } u, v = 0 \\ 1 & \text{otherwise} \end{cases}$$

Each pixel is represented by n bits (in order to represent one of the components Y, U or V) and the transformed coefficients are represented by (n+4) bits. The amplitude of the DCT coefficients is in the interval $[-2^{n+3} : +2^{n+3}-1]$.

Use is preferably made of a fast DCT encoding/decoding method.

This method, described in the article "Fast Algorithms for the Discrete Cosine Transform", E. Feig and S. Winograd, IEEE Trans. On Signal Proc., vol. 40, No. 9, September 1992, makes it possible to encode/decode macroblocks of size $2^m$ (here m=3) according to the following equation:

$$Y = C_8 * Y$$

where Y is the vector of the DCT coefficients of dimension 8 and $C_8$ the 8*8 matrix of DCT coefficients.

This matrix can be factorized and, after a few algebraic manipulations, this matrix is equal to $C_8 = P_8 * K_8 * B_8$, where $P_8$ is a matrix of permutation of the signs of dimension 8*8, $K_8$ and $B_8$ are matrices of coefficients of dimension 8*8 which have been defined so as to obtain a fast encoder/decoder.

Consecutively to step S326, the step S333 provides for a storage and viewing of the decoded macroblocks from units 21 and 23. The current image is reconstructed once all the macroblocks of that image are decoded and viewed.

Returning to step S320, if the result of the test is negative, this means that the macroblock was encoded in Inter or predictive mode.

During the following step S327, information is then retrieved from among the digital data transmitted by the device 4 and stored in the storage unit 21 of the client machine 2.

This information is specific to the encoding of the macroblock in Inter mode and is for example the statistical coefficients (variable-length codes) related to this macroblock.

Step S327 is followed by a step S328, which makes provision for decoding these statistical coefficients so as to obtain the differential movement vector.

During the following step S329, the movement vector is reconstructed from the differential movement vector and from the movement vector (Px,Py) of the macroblock of the previous image disposed at the same spatial position.

The algorithm used is as follows:

```
r_size = vop_fcode − 1
f = 1 << r_size
high = (32 * f) − 1;
low = ((−32) * f);
range = (64 * f);
if( (f == 1) || (horizontal_mv_data == 0) )
    MVDx = horizontal_mv_data;
else {
    MVDx = ( (Abs(horizontal_mv_data) − 1) * f) + horizontal_mv_residual + 1;
    if (horizontal_mv_data < 0)
        MVDx = −MVDx;
}
if( (f == 1) || (vertical_mv_data == 0) )
    MVDy = vertical_mv_data;
else {
    MVDy = ( (Abs(vertical_mv_data) − 1) * f) + vertical_mv_residual + 1;
    if (vertical_mv_data < 0)
        MVDy = −MVDy;
}
```

-continued
```
MVx = Px + MVDx;
if (MVx < low)
    MVx = MVx + range;
if (MVx > high)
    MVx = MVx – range;
MVy = Py + MVDy;
if (MVy < low)
    MVy = MVy + range;
if (MVy > high)
    MVy = MVy – range;
```

The parameters of the bit stream are such that the components MVDx and MVDy of the differential movement vector belong to the interval [low; high].

The extreme values of this interval are chosen when the decoder is implemented.

Moreover, the components of the reconstructed movement vector, MVx and MVy, also belong to this interval. The values which define this interval for the movement vectors are described in the standard *Information Technology—Generic Coding of Audio-Visual Objects=Part 2: visual*, ISO/IEC JTC 1/SC 29/WG11 N3056, December 2000.

It should be noted that r_size, f, MVDx, MVDy, high, low and range are variables, whereas the data horizontal_mv_data, vertical_mv_data, horizontal_mv_residual and vertical_mv_residual are extracted from the bit stream.

The variable vop_fcode refers to the prediction mode used which is extracted from the bit stream.

During this same step S329, the macroblock of the previous image is compensated for movement, that is to say the macroblock is moved by the movement vector which has just been reconstructed.

During the following step S330, the information specific to the encoding of the macroblock in Intra mode is retrieved and, in particular, the statistical coefficients which represent the difference macroblock.

During the following step S331, the difference macroblock is reconstructed from these statistical coefficients according to the Intra decoding method described previously, during the execution of steps S322 to S326.

Step S331 is followed by a step S332 which calculates the sum of the compensated macroblock of step S329 and the difference macroblock obtained at step S331.

Step S332 is followed by a step S333 which organizes the storage of the decoded macroblocks in the unit 21.

The image is then displayed on the display unit 23 once all the macroblocks have been decoded.

Figure 4A:
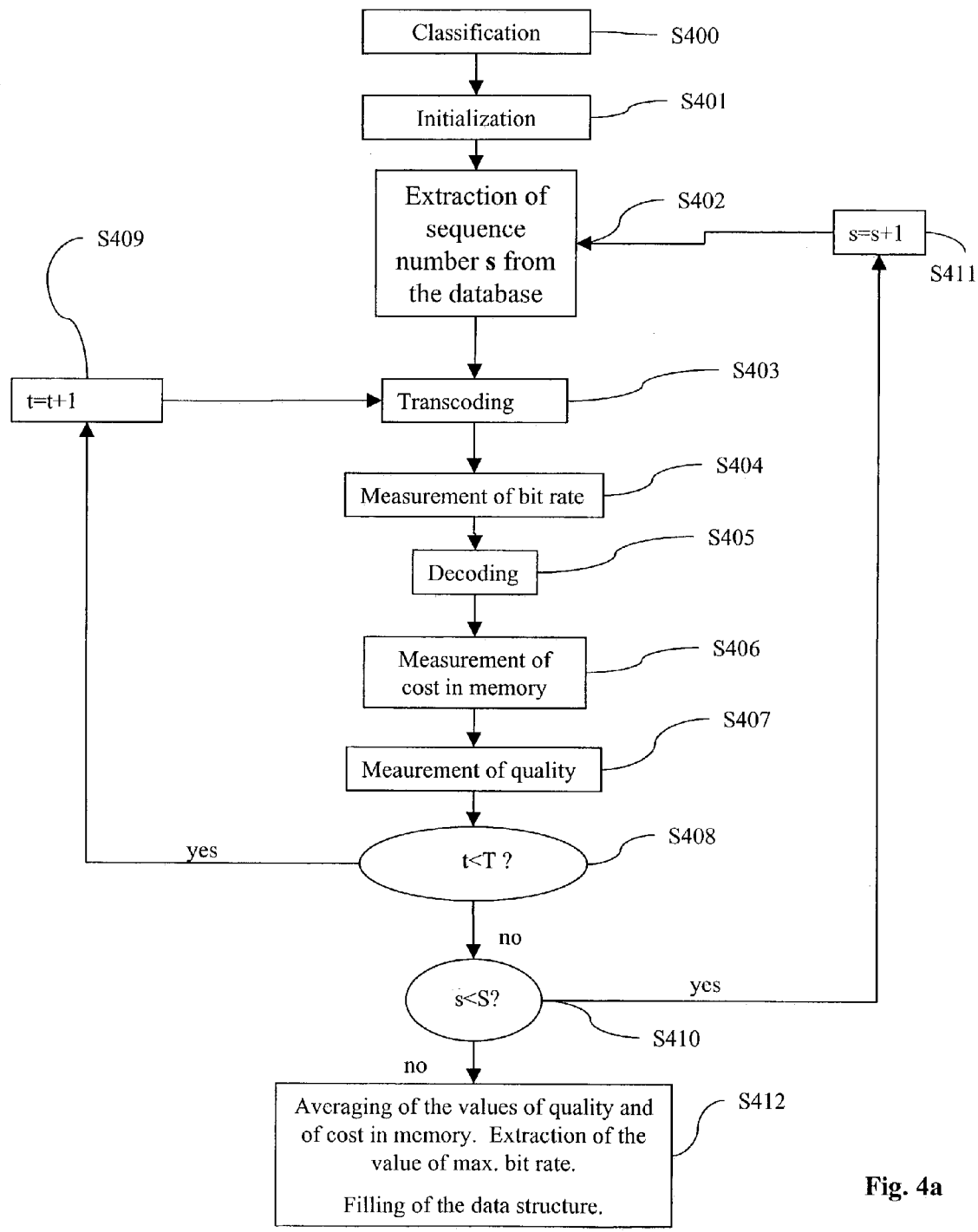
FIG. 4a represents an algorithm for obtaining the mean values of the characteristics representative of the transcoding methods of the set of transcoding methods.

With reference to FIG. 4a an algorithm will now be described whose execution will make it possible to obtain mean values of different characteristics representative of the set of methods of transcoding digital data mentioned above in the description made with reference to FIG. 2.

More particularly, this algorithm comprises different instructions or portions of software code corresponding to steps of the method of selecting a method for transcoding digital data according to the invention.

The computer program which is based on this algorithm is stored in the temporary data storage unit 13 of FIG. 1 and executed by the unit 17 under the control of the control unit 19.

This program forms part of the program "Progr" mentioned above with reference to FIG. 2 and is also stored in the apparatus of FIG. 7.

The algorithm of FIG. 4a commences with a first step S400 during which classification is carried out of the transcoding methods of the aforementioned set according to the type of these methods.

The classification operation consists of dividing the transcoding methods of the set of methods into three different types:

1) the first type of transcoding method corresponds to the transcoding methods based on a reduction of the spatial resolution. In accordance with this type, there are found a transcoding method maintaining the initial spatial resolution of a video sequence and a transcoding method reducing the initial resolution of that sequence from CIF format to QCIF format.

2) the second type of transcoding method corresponds to the transcoding methods which implement a reduction in the frame rate. Among the transcoding methods of the second type are a transcoding method maintaining the initial frame rate of the video sequence, transcoding methods implementing a reduction of the frame rate from 30 to 20 frames per second, from 30 to 15 frames per second, from 30 to 10 frames per second, from 30 to 5 frames per second, as well as a transcoding method implementing a reduction of the frame rate from 30 to 1 frame per second.

3) the transcoding methods of the third type are based on a reduction of the bit rate or re-quantization. Among these methods are a method of reduction of the bit rate which maintains the initial bit rate of the video sequence, transcoding methods implementing a reduction of the bit rate by 10%, a reduction of the bit rate by 20%, a reduction of the bit rate by 30%, and a transcoding method implementing a reduction of the bit rate by 40%.

The manner in which the mean values are obtained of different characteristics representative of each of the aforementioned transcoding methods will now be described.

In the example considered each transcoding method of the set may be represented by four different characteristics which are:

1) the mean visual quality produced by the transcoding method considered and which will be defined by the value of the PSNR given by the following formula:

$$PSNR = 10\ \log_{10}\left\{\frac{(2^Y)^2}{RMSE}\right\},$$

where RMSE is the root mean square error between the original video sequence and the transcoded video sequence and Y is the dynamic range of the original signal, corresponding in the present case to 8 bits.

It will be noted that the PSNR is thus determined on the basis of the ratio of the maximum amplitude of the signal to the root mean square error and corresponds to the Peak Signal to Noise Ratio.

The PSNR provides an estimation of the loss in quality between two video sequences.

2) a second characteristic representative of the transcoding methods is the cost in memory of a particular method, in other words the amount of memory space necessary for the decoding of the transcoded data generated by that method.

3) a third characteristic representative of the transcoding methods is the bit rate generated by each method.

4) a fourth characteristic representative of the transcoding methods is the format of the images after transcoding.

It will be noted that the algorithm 4a is executed while the device 4 of FIG. 1 is not connected to the communication apparatus 2.

In this manner, the number of calculations to be carried out when device 4 of FIG. 1 processes a request coming from the communication apparatus 2 is reduced.

Consecutively to step S400, a step S401 makes provision for an initialization to zero of two variables s and t which are respectively dedicated to the counting of the training sequences and of the transcoding methods of the set considered.

It will be noted that the sequences of so-called training data are test video data sequences which must form a sufficiently heterogenous set to represent practically all the extreme cases encountered in practice.

Thus, for example, among the training sequences are to be found sequences comprising little movement and others characterized by considerable movement, sequences with little texture, and others more textured, etc.

The example embodiment is concerned with a number S of training sequences which are stored in MPEG-4 format, for example, in the storage unit 5 of FIG. 1.

In this example a number T of transcoding methods will also be considered which constitute the set considered During the step S401, a three-dimensional table of values denoted TAB is created whose size is given by the formula T×S×3.

The value table TAB is adapted to receive for each training sequence and each transcoding method the values of three of the four characteristics mentioned earlier, i.e. the quality, the cost in memory, and the bit rate.

During the following step S402, the training sequence bearing the number s is extracted from the storage unit.

The algorithm next comprises a step S403 which carries out the transcoding of the training sequence s on the basis of the transcoding parameters provided by the transcoding method bearing the number t.

It will be noted that the transcoding method provides for decoding of the training sequence considered and for re-encoding it using the transcoding parameters allocated to the method considered.

It will be noted that the encoding and decoding algorithms used are those which have been described earlier with reference to FIGS. 3a and 3b.

The manner of proceeding to apply a transcoding method to a training sequence using one of the three types of transcoding methods has already been set out above and will not be repeated here.

Moreover, during that step S403, calculations are performed after decoding of the training sequence and before its re-encoding.

More particularly, a calculation is thus made of the variance of each decoded image and of the root mean square error (RMSE) between each image of the training sequence and the image which precedes it.

Next, over all the images, the mean is made of the variances and of the root mean square errors so calculated, to obtain respectively a mean variance and a root mean square error RMSE for the training sequence considered.

During the following step S404, a measurement is made of the bit rate produced by the transcoding method analyzed and that measurement is stored in the value table TAB at the position (s, t, 1).

During the following step S405, a decoding is made of the re-encoded training sequence which had been obtained by applying the transcoding method t.

During the following step S406, the information is retrieved on the cost in memory of the decoding operations made at the preceding step and this information is stored in the value table TAB at the position (s, t, 2).

It will be noted that the cost in memory of the decoding operations represents the amount of memory space necessary to perform these operations.

The following step S407 makes provision for carrying out a measurement of the quality (PSNR) of the transcoded training sequence with respect to the original training sequence and for storing that measurement of quality in the value table TAB at position (s, t, 3).

In order to be able to calculate a representative value of PSNR, it is necessary to compare training sequences of the same format and of the same frame rate.

To do this, we thought of bringing the transcoded sequence back to the resolution of the original sequence, both in temporal and spatial terms.

When the transcoding method makes provision for performing a reduction in format, each pixel located at the spatial position (x, y) of the transcoded sequence will be repeated 4 times in the re-dimensioned sequence at the positions (2x, 2y), (2x+1, 2y), (2x, 2y+1) and (2x+1, 2y+1).

When the transcoding method makes provision for performing a reduction in frame rate, the images that are lacking are replaced by repeating the last decoded image.

The PSNR values are next calculated between the original training sequence and the transcoded training sequence brought back to the original resolution.

It should be noted that this approach makes it possible in particular to simulate the loss in quality due to the change of resolution.

Step S407 is next followed by a step S408 during which a test is carried out in order to determine whether all the transcoding methods of the set of transcoding methods considered have been tested.

If not, that step is followed by a step S409 during which provision is made for incrementing by one unit the variable t representing the order of the transcoding methods in the set considered.

This step is followed by step S403 which has already been described above.

In the opposite case, if all the transcoding methods have been tested, then step S408 is followed by a step S410 during which another test is carried out in order to determine whether all the training sequences among the S sequences have been tested.

If not (s<S), step S410 is followed by a step S411 during which the variable s representing the order of the training sequences is incremented by one unit.

This step is next followed by step S402 which has already been described above.

It is however appropriate to note that when the variable t is incremented by one unit and thus when a new training sequence is taken into account, then the variable t is reinitialized to zero in order for all the transcoding methods to be applicable to that training sequence.

On the contrary, when all the training sequences have been tested (s=S), then step S410 is followed by a step S412 during which, for each of the transcoding methods of the set considered, the mean is taken of the quality values measured (first characteristic representative of the transcoding methods) and the values of the amount of memory used (second characteristic) which are stored in the value table TAB.

For each transcoding method, determination is also made of the maximum bit rate (third characteristic) produced by it on the basis of the values contained in the aforementioned table TAB.

According to the type considered of the transcoding method, the format of the transcoded training sequence (fourth characteristic) is deduced.

Figure 4B:
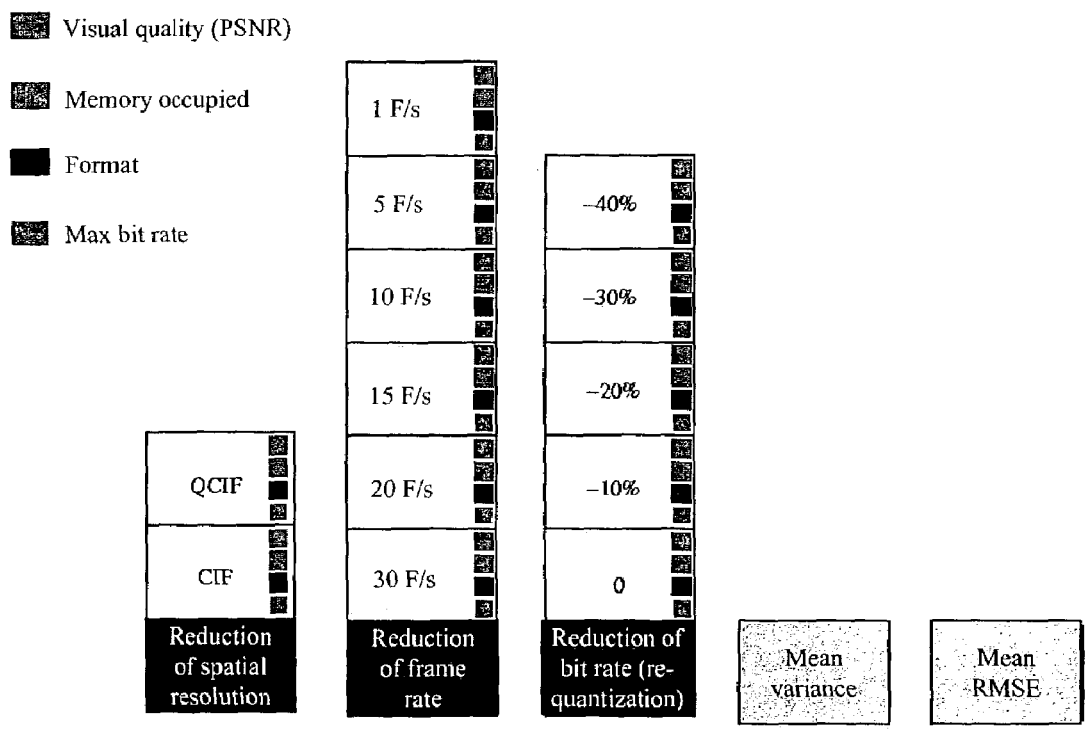

The different values which have just been calculated during step S412 are next introduced in the XML structure represented in FIG. 4b.

Thus, for the set of transcoding methods considered which are classified according to type of method, this structure reveals a mean value for each of the four characteristics representative of the transcoding method considered (quality, cost in memory, format, maximum bit rate).

During step S412 the means are also taken of the variances and the root mean square errors calculated for each training sequence so as to obtain a mean variance VAR and a mean RMSE for a set of training sequences.

As shown in FIG. 4b, this information is also stored in the XML structure considered.

This ends the algorithm of FIG. 4a.

It will be noted in addition that the format and the cost in memory (memory occupied) are two items of information which may be obtained from training sequences since they are little dependent on the video sequence to be transcoded. Moreover, if the maximum bit rate produced by each transcoding method is considered, an upper bound is thus obtained for the bit rate of each of the methods, which enables a certainty to be obtained to the effect that no sequence can produce a higher bit rate after transcoding.

As for the quality, this is very dependent on the video sequence to be transcoded since, from one sequence to another, the impact of the transcoding will be very different.

More particularly, for example, a sequence containing a large amount of movement will be greatly affected by a reduction in the frame rate whereas a static sequence will not be.

Taking these observations into account, attention will be given to a weighting of the values of mean quality for obtaining quality information adapted to a given video sequence, as will be seen in what follows.

Figure 5:
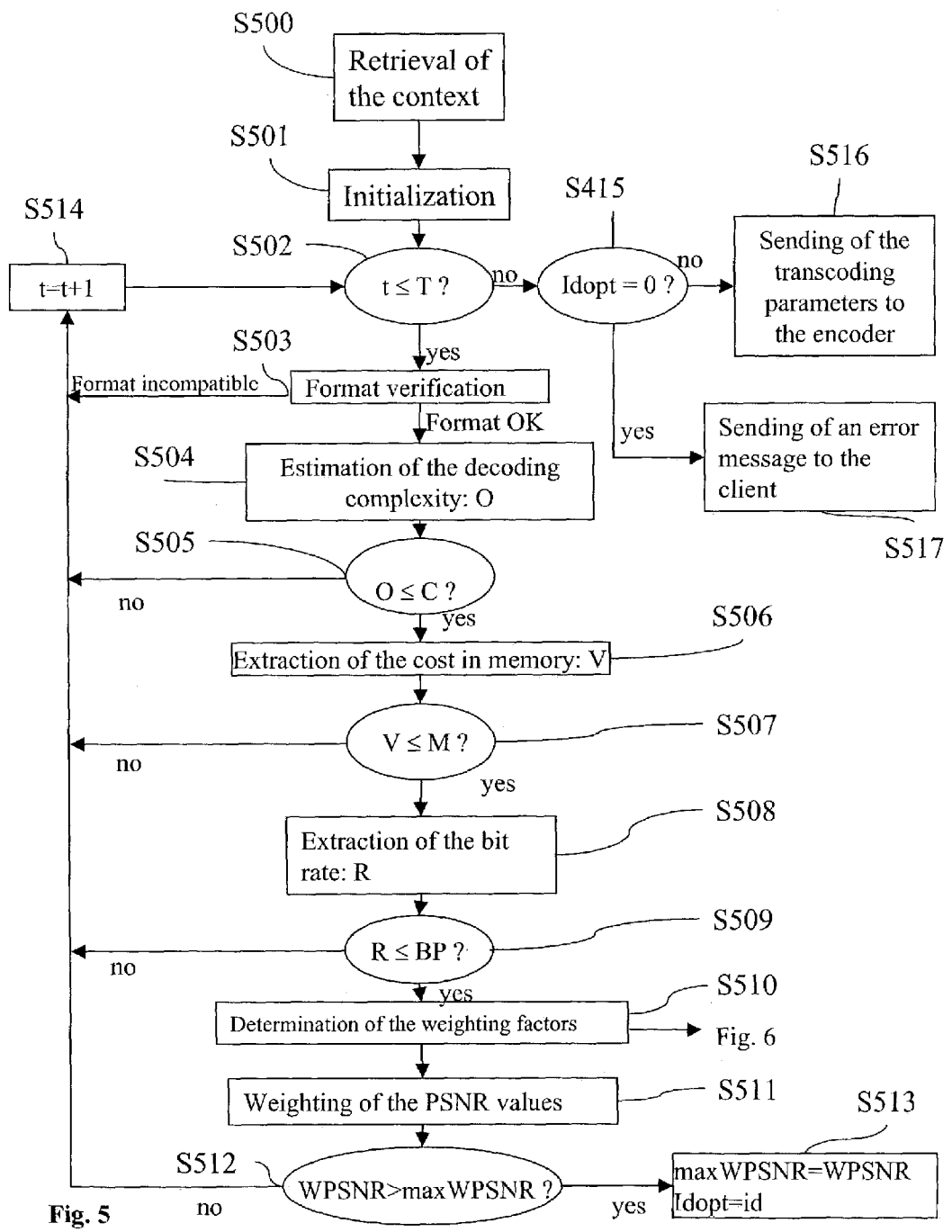
FIG. 5 shows an algorithm for selecting a method for transcoding digital multimedia data according to the invention and which corresponds to step S207 of the algorithm in FIG. 2.

FIG. 5 illustrates the algorithm detailing the different operations performed during step S207 of FIG. 2.

More particularly, this algorithm comprises different instructions or portions of software code corresponding to steps of the method of selecting a method for transcoding video data according to the invention.

The computer program which is based on this algorithm is stored in the temporary data storage unit 13 of FIG. 1 and executed by the unit 17 under the control of the control unit 19.

This program forms part of the program "Progr" mentioned above with reference to FIG. 2 and is also stored in the apparatus of FIG. 7.

The execution of the computer program based on this algorithm will implement the method making it possible to rapidly select the transcoding method best adapted to the content of the video sequence to be transmitted.

In the example described, the transcoding method selected will be that which supplies the client machine with an optimal visual quality.

Furthermore, this method will also enable a transcoding method to be selected which is adapted to one or more characteristics of the client machine 2, i.e. its calculation capacity, the screen resolution, the available memory, and/or the resources available on the communication network 3, i.e. the authorized bit rate BP (bandwidth).

It will be noted that the algorithm of FIG. 5 is implemented on the data of the video sequence required by and transmitted to the client machine 2.

The algorithm of FIG. 5 begins with a step S500 during which the context is retrieved in which the data will be transmitted from the device 4 of the server 1 to the client machine 2 (FIG. 1).

More particularly, the retrieval of this context consists of obtaining, from the temporary storage unit 13:

the computational capacity C of the client machine 2, the resolution of the screen of that machine, the bandwidth BP available on the communication network 3 for transmitting the video data.

During that step, there is also retrieved, from unit 16, the data structure represented in FIG. 4b and obtained by the off-line execution of the algorithm of FIG. 4a.

Step S500 is followed by the step S501 which initializes the values of a table of values of dimension T, where T represents the number of transcoding methods defined in the set of transcoding methods.

Furthermore, this step also initializes a table index variable t to the first value of the table equal to 0 (first transcoding method of the set of methods).

The following indexes are graduated up to T in steps of 1.

This step initializes to 0, on the one hand, a second variable Idopt which retrieves the identifier of the selected transcoding method and, on the other hand, a third variable maxWPSNR.

Step S501 is followed by the step S502 which verifies whether the variable t is less than or equal to T.

If this is the case, the step S503 is proceeded to, which verifies whether the transcoding method in course of evaluation will generate a sequence whose format will be compatible with the screen of the client machine.

If the format is incompatible, then step S514 is passed on to which increments the variable t by one unit, so making it possible to evaluate the next transcoding method of the set considered.

The step S502 already described is then executed again.

If the format is compatible, step S503 is followed by step 504 which evaluates the calculation complexity O of the process of decoding the transcoded video sequence.

To do this, for each image, there is retrieved the number of macroblocks encoded in Intra mode, $$NMB_{intra}^{orig},$$

and the number of macroblocks encoded in Inter mode, $NMB_{inter}^{orig}$, which make it up.

This information stored beforehand in unit 13 of FIG. 1, makes it possible to determine the decoding complexity of each image.

The decoding complexity of an image is given by the formula:

$$O_{Image} = NMB_{intra}^{orig} * O_{Intra} + NMB_{inter}^{orig} * O_{Inter}$$

The most complex image is searched for by going through all the images of the sequence.

An upper bound denoted O for the number of elementary operations per second necessary for the decoding of the sequence will be derived from the complexity of the most complex image which we will denote $O_{max}$ The upper bound denoted O will, for example, be calculated in the following manner:

$$O = O_{max} * F_t * \frac{NMB_{tans}}{NMB_{Ori}}$$

where $F_t$ is the frame rate produced by the transcoding method in course of evaluation ($F_t$ may have the following values: 30, 20, 15, 10, 5 or 1 frames per second), $NMB_{trans}$ is the number of macroblocks per image in the transcoded sequence (396 for a sequence in CIF format, 99 for a sequence in QCIF format), and $NMB_{Ori}$ is the number of macroblocks per image in the original sequence (for example 396).

The estimation of the decoding complexity of a macroblock varies according to whether the macroblock is encoded in Intra or Inter mode.

As described below, the estimation of the decoding complexity of a macroblock will be detailed depending on whether the encoding took place in Intra mode or in Inter mode.

1) Encoding in Intra Mode (Estimation of $O_{intra}$)

With the decoding taking place data block by data block, the decoding complexity of a macroblock is equal to the complexity related to the decoding of the four blocks which make it up.

More particularly, the decoding complexity of a block is determined by counting the number of elementary operations participating in the various algorithms used in the decoding process.

The values of the complexity related to the DCT decoding are supplied by the article "Fast Algorithms for the Discrete Cosine Transform", E. Feig and S. Winograd, *IEEE Trans. On Signal Proc.*, vol. 40, No. 9, September 1992.

Table 1 below details the determination of the decoding complexity of the different algorithms which participate in the decoding of a block using the different elementary operations.

TABLE 1

| processing | test | Multiplication | Addition | Allocation |
|---|---|---|---|---|
| VLD | | | | 64 |
| Inverse Q | 192 | 256 | | 192 |
| Saturation | 128 | | 64 | |
| Control | 2 | | 64 | 65 |
| Inverse DCT | | 94 | 454 | 64 |
| Total | 322 | 350 | 582 | 385 |

Preferentially, all these operations are considered to be elementary except the multiplication, which is considered to be equivalent to two elementary operations.

Thus the total decoding complexity of a macroblock (luminance components) encoded in Intra mode is 4*1989=7956 elementary operations.

2) Encoding in Inter Mode (Estimation of $O_{inter}$)

In the case where the macroblock is encoded in Inter mode, it is necessary to add, to the decoding complexity in Intra mode, the decoding complexity related on the one hand to the reconstruction of the movement vector from the differential movement vector which will be transmitted to the client machine 2 of FIG. 1 and on the other hand to the reconstruction of the macroblock (reconstruction of the difference macroblock and addition of this macroblock with the predicted macroblock).

The determination of the decoding complexity of these processes is detailed in table 2 below which supplies, for each process, the number of elementary operations which participate.

TABLE 2

| Processing | test | multiplication | Addition | Allocation |
|---|---|---|---|---|
| VLD | | | | 2 |
| Reconstruction of movement vector | 7 | 5 | 13 | 11 |
| Reconstruction of difference macroblock | 1288 | 1400 | 2328 | 1540 |
| Construction of predicted macroblock | | | 512 | 256 |
| Reconstruction of macroblock | | | 256 | 256 |
| Total | 1295 | 1405 | 3109 | 2065 |

Thus, for the Inter or predictive mode, the total decoding complexity of a macroblock encoded in Inter mode is 9279 elementary operations.

Once the complexity of decoding O has been estimated as proposed above, step S504 is followed by a step S505.

During step S505, it is tested whether the complexity O estimated for decoding the video with the current encoding parameters (current transcoding method t) is less than or equal to the calculation capacity of the client machine C.

If this is not the case, step S514 already described is passed on to.

If it is the case, this means that the transcoding method is compatible with the characteristic of the client machine.

Step S505 is then followed by step S506.

During this step, from the data structure represented in FIG. 4*b* and which is stored in unit 13 of FIG. 1, there is extracted the mean value of the cost in memory V of the current transcoding method t applied to the video sequence to be transcoded and to be transmitted (characteristic representative of the method).

The following step S507 makes provision for carrying out a test (V≦M ?) in order to determine whether the cost in memory associated with the current transcoding method is less than or equal to the size of the memory space M of the client machine 2.

If this is not the case, step S514 already described is passed on to.

If it is the case, from the data structure represented in FIG. 4b there is extracted the value of the bit rate R produced by the current transcoding method t on the video sequence to be transmitted.

This last step is followed by the step S509 which verifies whether the value of the bit rate R is less than or equal to the bandwidth BP of the communication network (bit rate constraint of the network).

If that is the case, step S509 is followed by a step S510 during which determination is made of the weighting factors which are to be attributed to each of the transcoding methods of the set considered according to the type of these methods.

The operations carried out during that step will be explained below in more detail in the description of the algorithm of FIG. 6.

This algorithm comprises different instructions or portions of software code corresponding to steps of the method of selecting a method for transcoding digital data according to the invention.

This algorithm forms part of the algorithm of FIG. 5.

To that end, the computer program which is based on this algorithm is stored in the temporary data storage unit 13 of FIG. 1 and executed by the unit 17 under the control of the control unit 19.

This program also forms part of the program "Progr" mentioned above with reference to FIGS. 2 and 5 and is also stored in the apparatus of FIG. 7.

Step S510 commences, in general terms, with the extraction of the information on variance and root mean square error of each image of the current video sequence stored in the temporary storage unit 13 of FIG. 1.

In addition, the mean values of variance and of RMSE stored in the XML data structure represented in FIG. 4b are extracted from unit 13.

Figure 6:
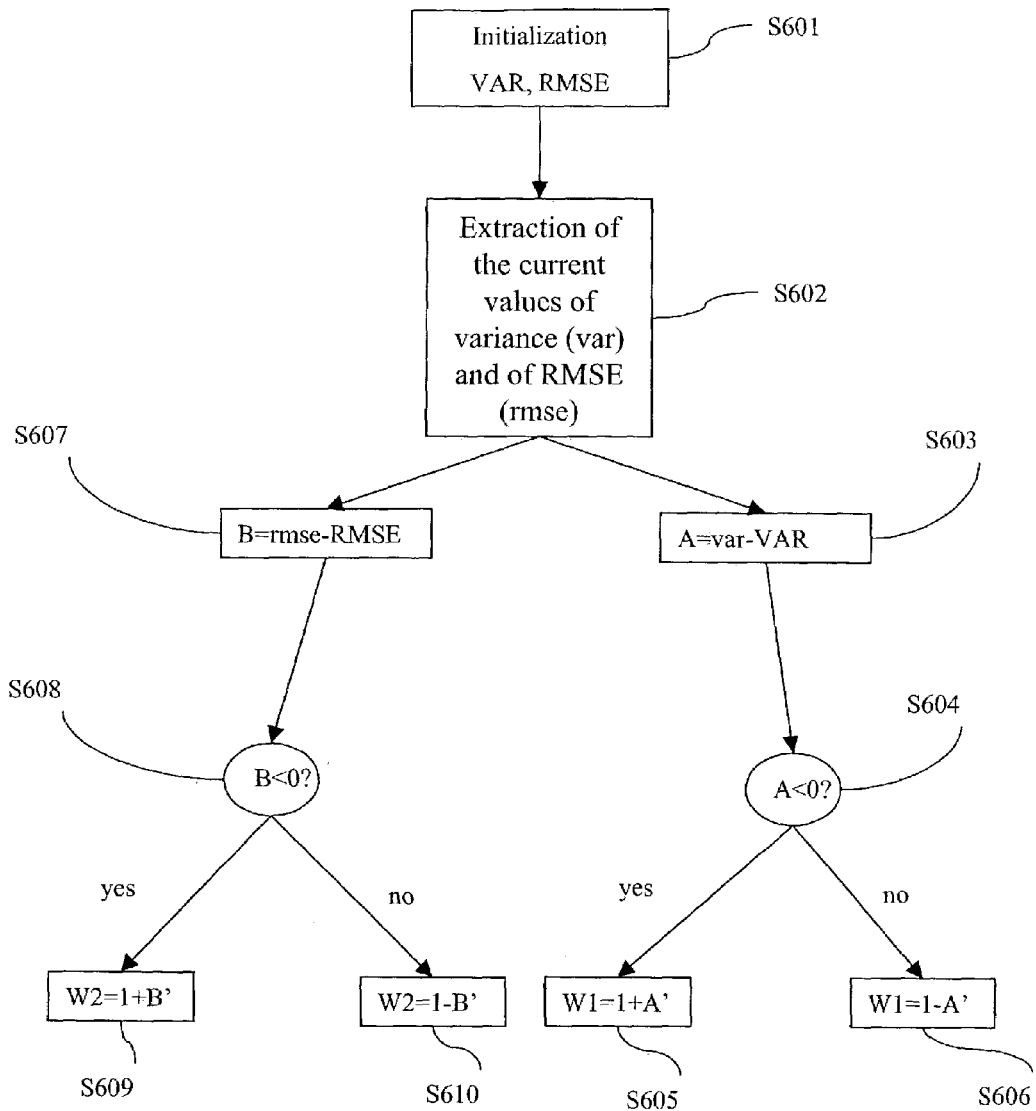
FIG. 6 represents an algorithm for determining weighting factors to attribute to the transcoding methods and which correspond to step S510 of FIG. 5.

The information which has just been extracted will now be used at the time of the execution of the algorithm of FIG. 6.

This algorithm commences with an initialization step S601 during which the variables VAR and RMSE are initialized to the mean values of the variance and RMSE which have been extracted previously from the data structure of FIG. 4b and which correspond to the current transcoding method t.

During the following step S602, the mean is taken, over the images of the current video sequence, of the variances and the root mean square errors RMSE's of the images of that sequence.

Variables denoted var and rmse then take as their values the means which have just been calculated.

The spatial activity and temporal activity have thus been measured of the video data which are to be transmitted, in that the spatial activity is provided by the variance and the temporal activity by the root mean square error.

It will be noted that, as for the spatial activity and the temporal activity of the training data sequences, they have been measured as indicated in the description made with reference to FIGS. 4a and 4b.

Step S602 is next followed by two steps S603 and S607 which may be performed in parallel or else one after the other. during step S603 the difference denoted A is determined between the variable var representing the variance of the current sequence and the variable VAR representing the variance of a set of training sequences.

Step S603 is next followed by a step S604 during which the aforementioned variables var and VAR are compared with each other by performing a test on the sign of the difference A.

When the difference A is negative, step S604 is followed by a step S605 during which a weighting factor $W_1$ is determined which is written $W_1=1+A'$, where $A'=|A|/255^2$ and which is deduced from the result of the comparison of step S604.

It will be noted that A' is here a normalized value between 0 and 1.

When A is greater than or equal to 0, the weighting factor is written $W_1=1-A'$ (step S606)

It will be noted that the weighting factors $W_1$ determined at steps S605 and S606 are to be attributed to the transcoding methods implementing a reduction in the spatial resolution or a reduction of the bit rate (re-quantization.)

As a matter of fact, the factors $W_1$ depend on the spatial activity of the current video sequence and a strong correlation exists between the spatial activity of a video sequence and the losses in quality generated by the transcoding methods dealt with above.

During step S607 cited earlier, the difference denoted B is determined between the value rms of the root mean square error of the current sequence and the value RMS of the root mean square error of a set of training sequences.

During the following step S608, provision is made for making a comparison between the measurements of temporal activity of the current video sequence and that of the training data sequences by determining the sign of the difference B.

When the sign of B is negative, step S608 is followed by a step S609 during which a weighting factor $W_2$ is determined which is written $W_2=1+B'$, where $B'=|B|/255^2$ and which is deduced from the result of the comparison of step S608.

It will be noted that B' is also a normalized value between 0 and 1.

If, on the contrary, B is greater than or equal to 0 then step S608 is followed by a step S610 during which a weighting factor $W_2$ is determined by the expression: $W_2=1-B'$.

It will be noted that the weighting factors $W_2$ which have just been determined at steps S609 and S610 are to be attributed to the transcoding methods implementing a reduction in the frame rate.

More particularly, the factors $W_2$ depend on the temporal activity of the current video sequence and a strong correlation exists between the temporal activity of a video sequence and the losses in quality generated by the transcoding methods dealt with above.

It will be noted that the weighting factors $W_1$ and $W_2$ which have just been determined depend on the video data to be transcoded and transmitted to the client machine 2 in that the differences A and B are respectively obtained from the variance and from the root mean square error calculated over the sequence of video data to be transcoded and transmitted.

In addition, in that the weighting factor depends on the root mean square error and that the latter is involved in the calculation of the quality characteristic which represents the transcoding methods, the determination of the weighting factor $W_2$ depends on that characteristic which will be weighted as will be seen later with reference to FIG. 5.

As soon as the weighting factors $W_1$ and $W_2$ have been determined by execution of the algorithm of FIG. 6, step S510 of FIG. 5 is terminated and is followed by a step S511.

During that step, the weighting is carried out of a mean value of one of the characteristics representative of the current transcoding method t and which is contained in the data structure XML represented in FIG. 4b.

In the example embodiment considered, the characteristic in question is the quality (PSNR) corresponding to the current transcoding method.

It will be noted that other characteristics representative of transcoding methods may of course be weighted by one of the factors $W_1$ and $W_2$.

Should the current transcoding method be a method based on a reduction in the spatial resolution or a reduction in the bit rate, the weighting factor to attribute to the current transcoding method is the weighting factor $W_1$ and the weighting operation is then carried out by multiplying the value of PSNR by the factor $W_1$ in order to obtain a weighted mean value denoted WPSNR.

Should the current transcoding method be based on a reduction in the frame rate, the adapted weighting factor is the factor $W_2$. The weighting operation will then be carried out by multiplying the value of PSNR by the factor $W_2$ in order to obtain the weighted mean value WPSNR.

By weighting the mean values of quality or of another characteristic representative of the current transcoding method by means of a weighting factor adapted to the transcoding method considered and which depends on the video data to be transcoded, a weighted mean value is thus obtained which is representative of the data to be transcoded.

It will be noted that, to the extent that the variance (and respectively the RMSE) is different from the mean variance (and respectively the mean RMSE) calculated with the help of the training data sequences, by weighting the quality values (PSNR), the transcoding methods should have a different impact on the quality of the sequence of video data to be transcoded.

The greater the difference between these variances (and respectively the root mean square errors), the more different this impact should be on the quality of the sequence according to the transcoding methods considered.

Furthermore, to the extent that, according to the type of the transcoding method considered, the variations in quality will be sometimes influenced by the spatial activity and sometimes by the temporal activity, it has been chosen to differently weight the transcoding methods according to their type.

It will furthermore be noted that for the same type of transcoding method, the differences in quality found between different transcoding methods of the same type should be maintained whatever the data sequence applied.

Step S511 is next followed by the step S512 which compares the calculated WPSNR with the value max-WPSNR.

If the WPSNR is greater than maxWPSNR, step S513 is proceeded to.

During that step, maxWPSNR takes the value of WPSNR and Idopt takes the value of the identifier id of the current transcoding method.

Step S513 is followed by the step S514 already described which increments the value of t by one unit in order to proceed to the following transcoding method.

If the result of the test carried out at step S512 is negative, step S514 is passed on to directly, which is followed by step S502.

When the result of the test carried out at step S502 is negative, this means that all the transcoding methods have been tested and this has given rise to a weighted mean value WPSNR for each method.

It should be noted that steps S512 and S513 of the algorithm make it possible to select the transcoding method for which the mean value of weighted quality WPSNR is the highest, as the different transcoding methods in the table are evaluated.

Step S502 is in that case followed by the step S515 which verifies if the variable Idopt is equal to 0.

A value of 0 in Idopt means that no transcoding method is compatible with the characteristics of the client machine or of the network.

In this case step S515 is followed by the step S517 during which the server sends an error message to the client machine notifying it that it will not be able to receive the requested video. This message will be sent through the intermediary of unit 18 of FIG. 1 and ends the execution of the algorithm.

If, on the contrary, Idopt is different from 0, step S515 is followed by the step S516 which sends the encoding parameters chosen with reference to the selected transcoding method to the encoding unit 11 which executes step S209 of FIG. 2.

These new parameters are, for example, a constraint of bit rate, the format of the transcoded sequence and the frame rate of that transcoded sequence. Note that, in the example embodiment described, the parameters transmitted correspond to the transcoding method compatible with the characteristics of the client machine and of the network and which maximize the visual quality.

Furthermore, steps S503, S505, S507, and S509 are test steps the object of which is to test the compatibility of each transcoding method evaluated on the execution of a loop of the algorithm with constraints associated with the client machine 2 and with the network 3.

It will be noted that in the example embodiment considered the transcoding method is selected in relation to an entire data sequence.

However, it is entirely possible to modify the granularity of that decision making by selecting a method for each image or for a group of images.

To do this, the value of the root mean square error rmse of step S602 of FIG. 6 will be replaced by a value of root mean square error per image or for a group of images according to the case envisaged.

With reference to FIG. 7, an example of a programmable apparatus implementing the invention is described. This apparatus is adapted to process multimedia digital data with a view to transmitting them.

According to the chosen embodiment shown in FIG. 7, an apparatus implementing the invention is for example a microcomputer 700 or a workstation connected to different peripherals, for example a digital moving image camera 701 (or a scanner, or any means of acquiring or storing an image) connected to a graphics card and supplying to the apparatus data to be processed and transmitted.

The apparatus 700 comprises a communication bus 702 to which there are connected:

- a central processing unit 703 (microprocessor), which fulfills the function of the control unit 19 of FIG. 1,
- a read-only memory 704, able to contain the program "Progr",
- a random access memory 706, comprising registers 707 adapted to record variables created and modified during the execution of the program referred to above and in particular the variables R, BP, O, C, V, M, PSNR, MaxWPSNR, WPSNR, Idopt, id, t, T, s, S, A, B, VAR, var, RMSE, $W_1$, and $W_2$ mentioned with reference to the earlier Figures, a screen 708 for displaying the data to be processed and/or serving as a graphical interface with the user, who will be able to interact with the program according to the invention, using a keyboard 710 or any other means such as a pointing device, not shown, for example a mouse or light pen, a hard disk 712 able to contain the aforementioned program "Progr", a disk drive 714 adapted to receive a diskette 716 and to read or write thereon data processed or to be processed according to the invention, a communication interface 718 connected to a communication network 720, for example the Internet, the interface being able to transmit and receive data.

Note that apparatus 700 rapidly selects the transcoding method best adapted to the content of the video sequence to be transmitted to a client machine and which will deliver an optimal visual quality.

The selection method which is implemented by apparatus 700 produces a low calculation cost and only requires a small amount of memory space.

This apparatus next performs a transcoding of the sequence with the method selected and thus transmits the transcoded sequence.

The communication bus allows communication and interoperability between the different elements included in the microcomputer 700 or connected to it. The representation of the bus is non-limiting and, in particular, the central processing unit is able to communicate instructions to any element of the microcomputer 700 directly or by means of another element of the microcomputer 700.

The executable code of the program denoted "Progr" enabling the programmable apparatus to implement the methods of retrieving the context (FIG. 2), encoding/decoding (FIGS. 3a and 3b) and the method of selecting a method of transcoding the data (FIGS. 4a, 5 and 6) according to the invention, can be stored for example on the hard disk 712 or in read-only memory 704 as shown in FIG. 7.

Although only one program is identified, it is possible to have several programs or subprograms for implementing the invention.

According to a variant, the diskette 716 can contain data that is compressed and stored, as well as the executable code of the program or programs according to the invention which, once read by the apparatus 700, will be stored on the hard disk 712.

As a second variant, the executable code of the program or programs can be received by means of the communication network 720, via the interface 718, in order to be stored in an identical fashion to that described previously.

The diskettes can be replaced by any information carrier such as a compact disc (CD-ROM) or a memory card. Generally, an information storage means, which can be read by a computer or microprocessor, integrated or not into the device, and which may possibly be removable, is adapted to store a program whose execution permits the implementation of the method according to the invention.

In more general terms, the program can be loaded into one of the storage means of the apparatus 700 before being executed.

The central processing unit 703 will control and direct the execution of the instructions or portions of software code of the program or programs according to the invention, instructions which are stored on the hard disk 712 or the read only memory 704 or in the other aforementioned storage elements. On powering up, the program or programs which are stored in a non-volatile memory, for example the hard disk 712 or the read only memory 704, are transferred into the random access memory 706, which will then contain the executable code of the program or programs according to the invention, as well as registers for storing the variables necessary for implementation of the invention.

It should be noted that the data processing apparatus comprising a device according to the invention can also be a programmed apparatus.

This apparatus then contains the code of the computer program or programs for example fixed in an application specific integrated circuit (ASIC).

It should be noted that the apparatus in FIG. 7 which contains the program "Progr" previously mentioned may, in the context of a communication architecture of the client-server type, be the device 4 in FIG. 1.

The invention claimed is:

1. A method for selecting a method from a set of methods of transcoding video data, said data being liable to be transmitted between at least two communication apparatuses via a communication network, wherein said selection method comprises the following steps:

determining at least one weighting factor $W_1$, $W_2$ to attribute to each of the transcoding methods of the set, said at least one weighting factor depending on the data to be transcoded;

weighting a mean value of at least one characteristic representative of each of the transcoding methods of the set by applying adapted weighting factors $W_1$, $W_2$; and selecting a transcoding method as a function of the weighted mean values, wherein it comprises a prior step of obtaining a mean value of at least one characteristic representative of each of the transcoding methods of the set, for each method, on the basis of a plurality of values of the characteristic considered which have respectively been obtained by the application of the method concerned to a plurality of so-called training data sequences.

2. A selection method according to claim 1, wherein the step of determining said at least one weighting factor makes provision, on the one hand, for measuring the spatial activity and the temporal activity of the data to be transcoded and of the training data sequences, and on the other hand, for comparing between the measurements of the same nature.

3. A selection method according to claim 2, wherein the determining step further comprises deducing said least one weighting factor from the result of the comparisons made between the measurements.

4. A selection method according to claim 2, wherein a characteristic representative of each of the transcoding methods of the set is a measurement of the quality produced by the method concerned, the spatial activity is measured by the variance, and the temporal activity is measured by the root mean square error.

5. A selection method according to claim 3, wherein the spatial activity is measured by the variance and the temporal activity is measured by the root mean square error and a weighting factor is written as $W_1=1\pm A'$ according to the sign of A', with $A'=|A|/255_2$ and $A =\text{var}-\text{VAR}$, where var represents a measurement of the variance of the data to be transcoded and VAR represents a measurement of the variance of the training data sequences.

6. A selection method according to claim 3, wherein the spatial activity is measured by the variance and the temporal activity is measured by the root mean square error and a weighting factor is written as $W_2=1\pm B'$ according to the sign of B', with $B'=|B|/255^2$ and B=rinse−RMSE, where rinse represents a measurement of the root mean square error of the data to be transcoded and RMSE represents a measurement of the root mean square error of the training data sequences.

7. A device for selecting a method from a set of methods of transcoding video data, said data being liable to be transmitted between at least two communication apparatuses via a communication network, wherein the device comprises:
   means for determining at least one weighting factor $W_1$, $W_2$ to attribute to each of the transcoding methods of the set, said at least one weighting factor depending on the data to be transcoded;
   means for weighting a mean value of at least one characteristic representative of each of the transcoding methods of the set by applying adapted weighting factors $W_1$, $W_2$;
   means for selecting a transcoding method as a function of the weighted mean values; and
   means for obtaining a means value of at least one characteristic representative of each of the transcoding methods of the set, for each method, on the basis of a plurality of values of the characteristic considered which have respectively been obtained by the application of the method concerned to a plurality of so-called training data sequences.

8. A device according to claim 7, wherein the means for determining said at least one weighting factor, on the one hand, measures the spatial activity and the temporal activity of the data to be transcoded and of the training data sequences, and on the other hand compares between the measurements of the same nature.

9. A device according to claim 8, wherein the determining means deduces furthermore said at least one weighting factor from the result of the comparisons made between the measurements.

10. A device according to claim 8, wherein a characteristic representative of each of the transcoding methods of the set is a measurement of the quality produced by the method concerned, the spatial activity is measured by the variance, and the temporal activity is measured by the root mean square error.

11. A device according to claim 9, wherein the spatial activity is measured by the variance and the temporal activity is measured by the root mean square error and a weighting factor is written as $W_1=1\pm A'$ according to the sign of $A'=|A|/255^2$ and A=var−VAR, where var represents a measurement of the mean variance of the data to be transcoded and VAR represents a measurement of the mean variance of the training data sequences.

12. A device according to claim 9, wherein the spatial activity is measured by the variance and the temporal activity is measured by the root mean square error and a weighting factor is written as $W_2=1\pm B'$, according to the sign of B', with $B'=|B|/255^2$ and B=rinse−RMSE, where rinse represents a measurement of the root mean square error of the data to be transcoded and RMSE represents a measurement of the root mean square error of the training data sequences.

\* \* \* \* \*

UNITED STATES PATENT AND TRADEMARK OFFICE
CERTIFICATE OF CORRECTION

PATENT NO. : 7,142,599 B2  Page 1 of 1
APPLICATION NO. : 10/436269
DATED : November 28, 2006
INVENTOR(S) : Xavier Henocq It is certified that error appears in the above-identified patent and that said Letters Patent is hereby corrected as shown below:

COLUMN 2:
Line 17, "information technology," should read --Information Technology,--.

COLUMN 4:
Line 28, "obtain" should read --obtained--.

COLUMN 14:
Line 21, "$_{pixel+3}$-1" should read --$^{pixel+3}$-1--.

COLUMN 26:
Line 16, "S606)" should read --S606).--.

COLUMN 30:
Line 64, "$255_2$" should read --$255^2$--.

COLUMN 31:
Line 5, "rinse" (both occurrences) should read --rmse--.

COLUMN 32:
Line 27, "rinse" (both occurrences) should read --rmse--.

Signed and Sealed this

Sixth Day of November, 2007

JON W. DUDAS
*Director of the United States Patent and Trademark Office*